United States Patent [19]
Koizumi et al.

[11] Patent Number: 5,548,706
[45] Date of Patent: Aug. 20, 1996

[54] CAD SYSTEM WITH PARALLEL DIMENSION-LINE EDITING FUNCTION

[75] Inventors: Ayako Koizumi; Yukiko Mori; Tomomi Aoki, all of Kawasaki, Japan

[73] Assignee: Fujitsu Limited, Kawasaki, Japan

[21] Appl. No.: 128,134

[22] Filed: Sep. 29, 1993

[30] Foreign Application Priority Data

Sep. 29, 1992 [JP] Japan .................................. 4-259398
Sep. 29, 1992 [JP] Japan .................................. 4-259399
Sep. 29, 1992 [JP] Japan .................................. 4-259400

[51] Int. Cl.⁶ .................................................. G06F 15/00
[52] U.S. Cl. ...................... 395/161; 364/474.24; 395/139
[58] Field of Search ...................... 395/155–161, 395/139, 118–119; 364/474.24, 480–481, 488–491, 505, 512, 188–190; 345/117–120, 131

[56] References Cited

U.S. PATENT DOCUMENTS

| | | | |
|---|---|---|---|
| 4,791,478 | 12/1988 | Tredwell et al. | 395/119 X |
| 4,803,474 | 2/1989 | Kulp | 395/139 |
| 5,051,927 | 9/1991 | Tada et al. | 364/189 |
| 5,179,656 | 1/1993 | Lisle | 395/119 X |
| 5,297,254 | 3/1994 | Arai et al. | 395/161 |
| 5,396,590 | 3/1995 | Kreegar | 395/159 |

FOREIGN PATENT DOCUMENTS

| | | | |
|---|---|---|---|
| 60-061866 | 4/1985 | Japan | G06F 15/40 |
| 3-070079 | 3/1991 | Japan | G06F 15/60 |
| 4-199367 | 7/1992 | Japan | G06F 15/60 |
| 4-253278 | 9/1992 | Japan | G06F 15/60 |

OTHER PUBLICATIONS

Mills, "Design View Links Geometry and Equations", Computer Aided Engineering, Sep. 1989, p. (1).
Robinson, "Engineering Sketchbook", Comp. Graphics World, Sep. 1989, pp. 117, 120–121.
MacDraw Pro User's Guide, Claris Corp., 1991, pp. 2–2 to 2–31, 2–40 to 2–45.

Primary Examiner—Mark R. Powell
Assistant Examiner—John E. Breene
Attorney, Agent, or Firm—Staas & Halsey

[57] ABSTRACT

A Computer Aided Design (CAD) system with a dimension line editing function manages a drawing involving dimension lines and displays the drawing on a display unit connected to a terminal. The system edits the drawing according to a specified one of the dimension lines. The system has a setting unit for interactively setting an objective dimension line through the terminal; a retrieving unit for retrieving, in the drawing, dimension lines that are in parallel with the objective dimension line; and an editing unit for editing drawing data corresponding to the objective and parallel dimension lines according to a change quantity entered for the objective dimension line. The CAD system only asks a user to specify an objective dimension line to be edited as well as a change quantity applied to the dimension line. According to the specified data, the CAD system edits drawing data corresponding to the objective dimension line as well as drawing data corresponding to dimension lines that are parallel to the objective dimension line. This CAD system never asks the user to specify endpoints of the dimension lines to be edited one by one, so that the user can efficiently edit drawing data involving many dimension lines.

15 Claims, 28 Drawing Sheets

Fig. 12A
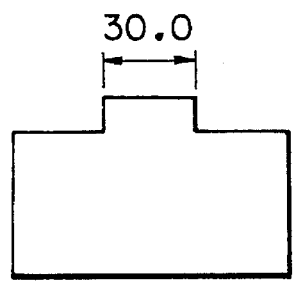
Fig. 12B    Fig. 12C    Fig. 12D
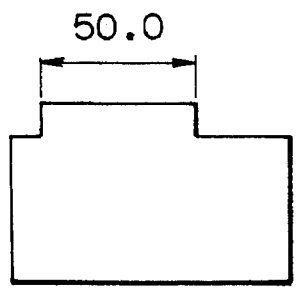 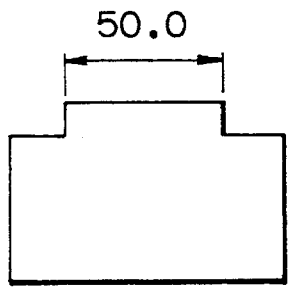 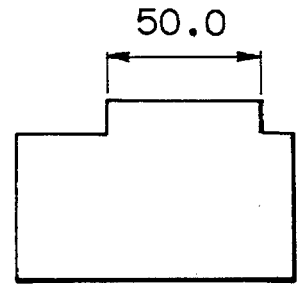

Fig. 18A
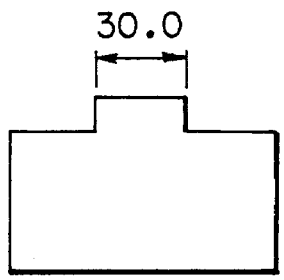
Fig. 18B  Fig. 18C  Fig. 18D
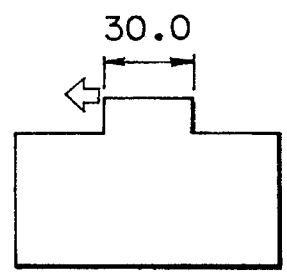 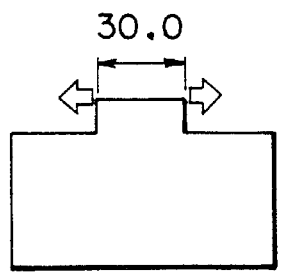 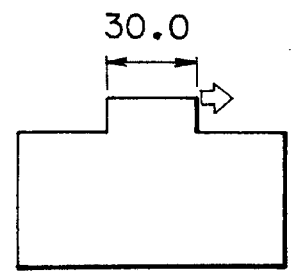
Fig. 18E  Fig. 18F  Fig. 18G
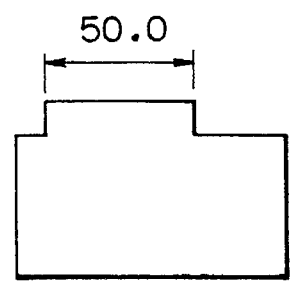 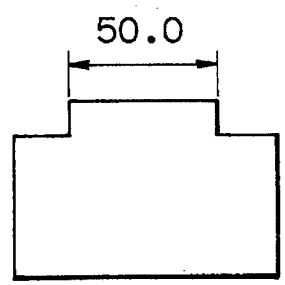 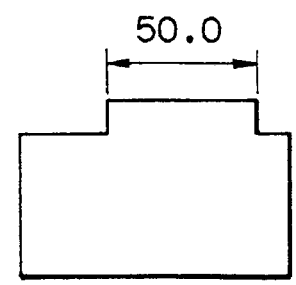

Fig. 19A
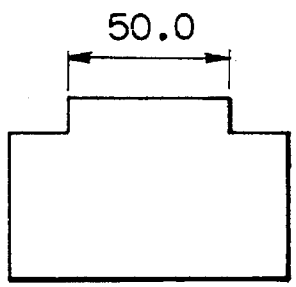
Fig. 19B    Fig. 19C    Fig. 19D
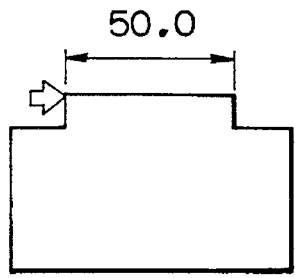 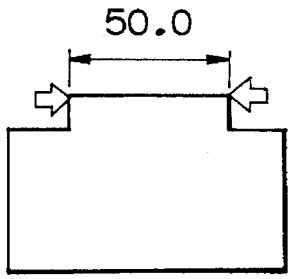 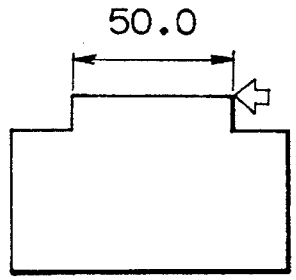
Fig. 19E    Fig. 19F    Fig. 19G
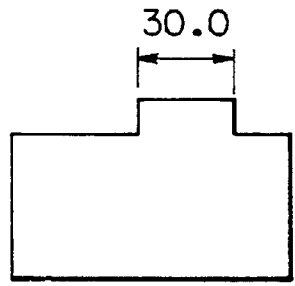 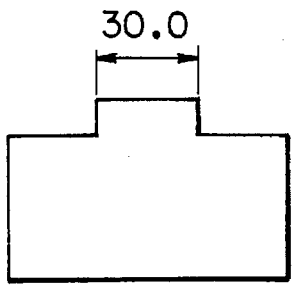 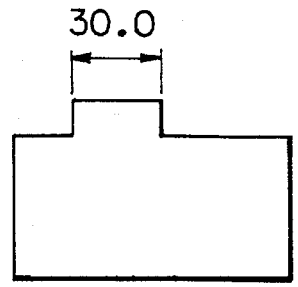

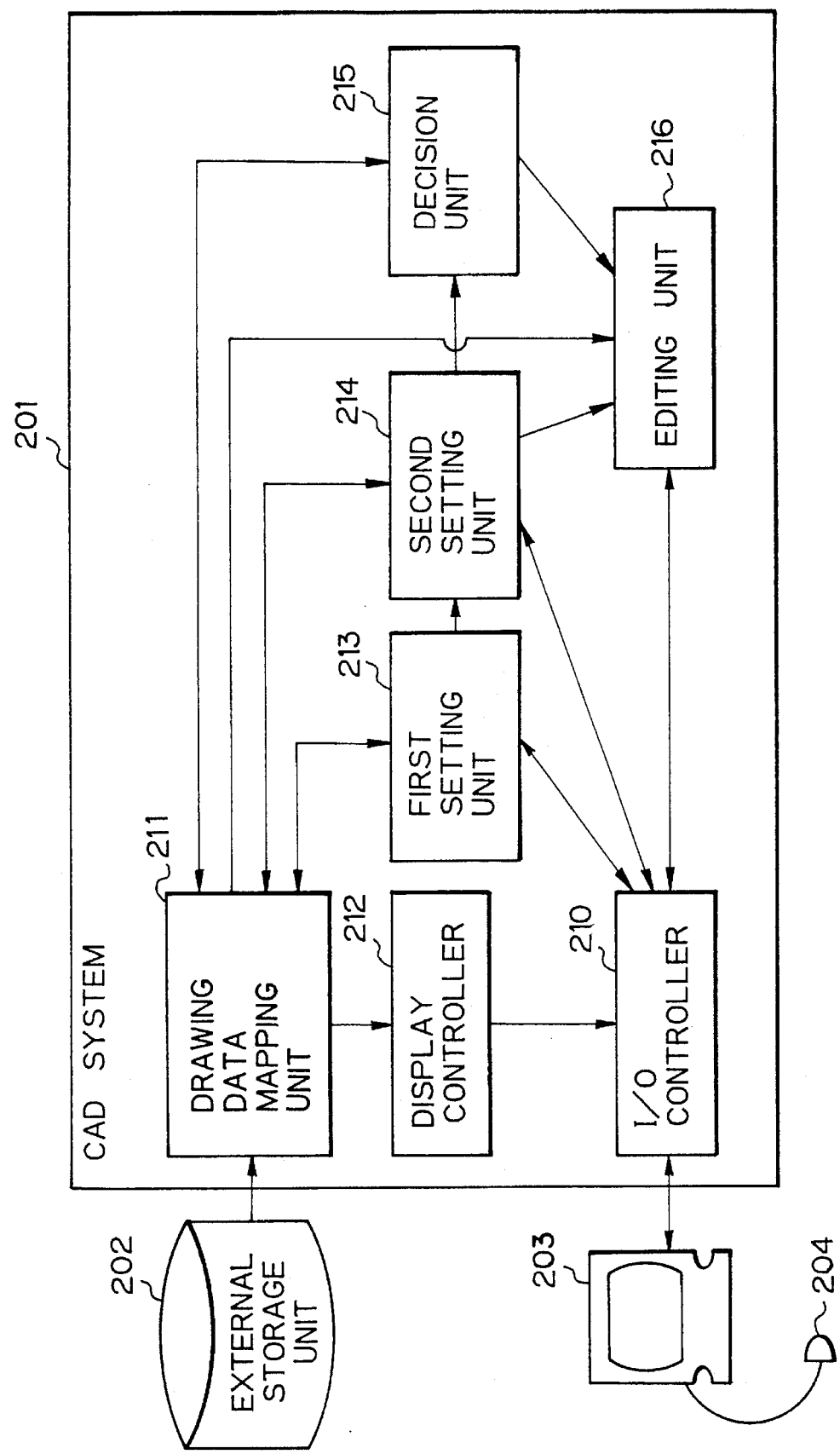

Fig. 29A

| ID No. | DRAWING ELEMENT DATA |
|---|---|
| ID 1 | DRAWING ELEMENT DATA 1 |
| ID 2 | DRAWING ELEMENT DATA 2 |
| ⋮ | ⋮ |

Fig. 29B

| FIRST SEGMENT | THIRD SEGMENT | CUT LENGTH | |
|---|---|---|---|
| | | C 1 | C 2 |
| ID 1 | ID 2 | $\alpha 1$ | $\alpha 2$ |
| ID 3 | ID 4 | $\alpha 3$ | $\alpha 4$ |
| ⋮ | ⋮ | ⋮ | ⋮ |

CAD SYSTEM WITH PARALLEL
DIMENSION-LINE EDITING FUNCTION

BACKGROUND OF THE INVENTION

1. Field of the Invention

The present invention relates to a CAD system with a dimension-line editing function for editing drawing data corresponding to a given dimension line, and particularly, to a computer aided design (CAD) system with a dimension-line editing function for efficiently editing drawing data involving many dimension lines.

2. Description of the Related Art

Computer aided design (CAD) systems are employed to edit machine drawings, etc. The CAD systems display drawings that involve dimension lines, and users interactively enter data for editing the dimension lines. According to the entered data, the CAD systems process the drawing. The CAD systems must efficiently edit and process drawing data even if the data involve many dimension lines.

To edit a drawing according to the dimension lines thereof with a conventional CAD system, a user must specify an objective dimension line, an endpoint of the dimension line to edit, and the target length of the dimension line. According to these data, the CAD system processes drawing data corresponding to the objective dimension line. Since the conventional CAD system asks a user to specify objective dimension lines one by one, it takes a long time to edit a drawing if it involves many dimension lines.

Another conventional CAD system asks a user to enter the numeric relationships between dimension lines that are in parallel with one another in a drawing, an endpoint of a reference dimension line to be edited, and a target length for the reference dimension line. According to these data, the CAD system calculates target lengths of the parallel dimension lines, and according to the results of the calculations, edits drawing data corresponding to the endpoints of these dimension lines. Although the user is not asked to specify the dimension lines one by one, the user must register the numeric relationships between the dimension lines. This results in increasing the editing time for the drawing.

In any conventional CAD system, a user must always specify an endpoint to edit an objective dimension line.

SUMMARY OF THE INVENTION

An object of the present invention is to provide a computer aided design (CAD) system with a novel dimension-line editing function for efficiently editing a drawing that involves many dimension lines.

According to a first aspect of the present invention, there is provided a CAD system for managing a drawing involving dimension lines, displaying the drawing on a display unit connected to a terminal, and editing the drawing according to a specified one of the dimension lines, wherein the CAD system comprises a setting unit for interactively setting (selecting) an objective dimension line through the terminal, a retrieving unit for retrieving, in the drawing, dimension lines that are in parallel with the objective dimension line, and an editing unit for editing drawing data corresponding to the objective and parallel dimension lines according to a change quantity entered for the objective dimension line.

The editing unit may determine drawing data to be edited according to positional data for the objective dimension line, the positional data being set during the setting process carried out by the setting unit. The CAD system may further comprise an area setting unit for interactively setting a retrieval area in which the retrieving unit retrieves the parallel dimension lines. The objective dimension line set by the setting unit may be the shortest or the dimension lines that are parallel to one another.

According to a second aspect of the present invention, there is provided a CAD system for managing a drawing involving dimension lines, displaying the drawing on a display unit connected to a terminal, and editing the drawing according to a specified one of the dimension lines, wherein the CAD system comprises a setting unit for interactively setting an objective dimension line through the terminal and selecting one or both of endpoints of the objective dimension line according to positional data of the objective dimension line specified during the setting process, and a decision unit for determining a changing direction of the objective dimension line according to a change quantity set for the objective dimension line.

The CAD system may further comprise a mark display controlling unit for displaying a direction mark on the display unit, the direction mark indicating the changing direction determined by the decision unit and being displayed in the vicinity of the endpoint set by the setting unit. The mark display controlling unit may employ an arrow mark as the direction mark.

Further, according to a second aspect of the present invention, there is also provided a CAD system for managing a drawing involving dimension lines, displaying the drawing on a display unit connected to a terminal, and editing the drawing according to a specified one of the dimension lines, wherein the CAD system comprises a first setting unit for interactively setting an objective dimension line through the terminal, a second setting unit for interactively selecting one or both of endpoints of the objective dimension line through the terminal, and a decision unit for determining a changing direction of the objective dimension line according to a change quantity specified for the objective dimension line.

The CAD system may further comprise a mark display controlling unit for displaying a direction mark on the display unit, the direction mark indicating the changing direction determined by the decision unit and being positioned in the vicinity of the endpoint set by the second setting unit. The mark display controlling unit may employ an arrow mark as the direction mark.

According to a third aspect of the present invention, there is provided a CAD system for managing a drawing involving dimension lines, displaying the drawing on a display unit connected to a terminal, and editing the drawing according to a specified one of the dimension lines, wherein the CAD system comprises a setting unit for interactively setting an objective dimension line through the terminal and selecting drawing data to be edited among drawing data corresponding to the objective dimension line according to positional data of the objective dimension line specified during the setting process, a decision unit for determining whether or not the drawing data to be edited includes a chamfer, and an editing unit for editing the drawing data to be edited according to a change quantity given to the objective dimension line without deforming the chamfer found by the decision unit.

Further, according to a third aspect of the present invention, there is also provided a CAD system for managing a drawing involving dimension lines, displaying the drawing on a display unit connected to a terminal, and editing the drawing according to a specified one of the dimension lines, wherein the CAD system comprises a first setting unit for interactively setting an objective dimension line through the terminal, a second setting unit for interactively setting, through the terminal, drawing data to be edited among drawing data corresponding to the objective dimension line, a decision unit for determining whether or not the drawing data to be edited includes a chamfer, and an editing unit for editing the drawing data to be edited according to a change quantity given to the objective dimension line without deforming the chamfer found by the decision unit.

BRIEF DESCRIPTION OF THE DRAWINGS

The present invention will be more clearly understood from the description of the preferred embodiments as set forth below with reference to the accompanying drawings, wherein:

FIGS. 12A to 12D explain the problems of a CAD system with a conventional dimension-line editing function;

FIGS. 18A to 18G explain the dimension line lengthening mark displaying process in the CAD system according to the second aspect of the present invention;

FIGS. 19A to 19G explain the dimension line shortening mark displaying process in the CAD system according to the second aspect of the present invention;

FIG. 24 shows a principle of a CAD system with a dimension-line editing function according to a third aspect of the present invention;

FIGS. 29A and 29B explain drawing data in the CAD system according to the third aspect of the present invention;

DESCRIPTION OF THE PREFERRED EMBODIMENTS

For a better understanding of the preferred embodiments of the present invention, the problems of the prior art will be explained with reference to FIGS. 1A, 1B, 2A, and 2B.

The conventional computer aided design CAD system asks a user to specify an objective dimension line to edit, an endpoint of the dimension line to change, and a target length of the objective dimension line. According to these data, the CAD system edits drawing data corresponding to the objective dimension line.

Figure 1A:
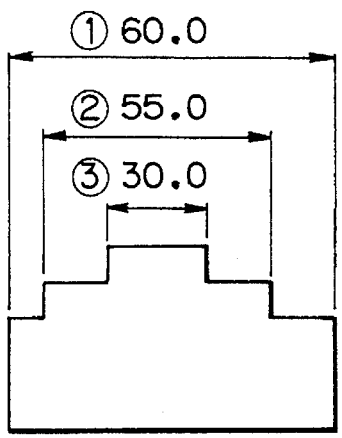
FIG. 1A and 1B explain a dimension-line editing function, of a CAD system according to a prior art.
Figure 1B:
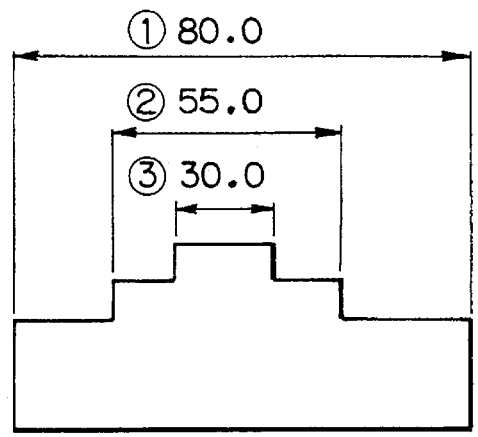

FIGS. 1A and 1B explain a dimension-line editing function of the conventional CAD system.

FIG. 1A shows a drawing displayed on a display unit. A user wants to uniformly lengthen both ends of a dimension line (1) from 60.0 to 80.0. The user specifies the dimension line (1) as an objective dimension line. The user specifies both ends of the dimension line (1) to change. The user enters 80.0 as a target length of the dimension line (1). According to these specifications, the CAD system edits drawing data corresponding to the dimension line (1), to form a dimension line (1) shown in FIG. 1B.

Figure 2A:
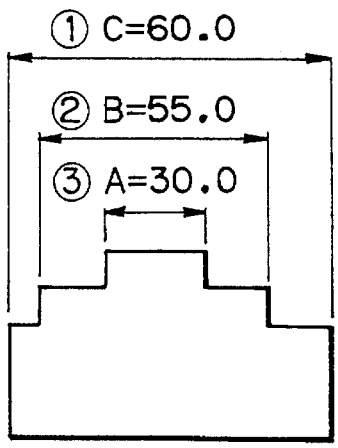
FIGS. 2A and 2B explain a dimension-line editing function of a CAD system according to another prior art.
Figure 2B:
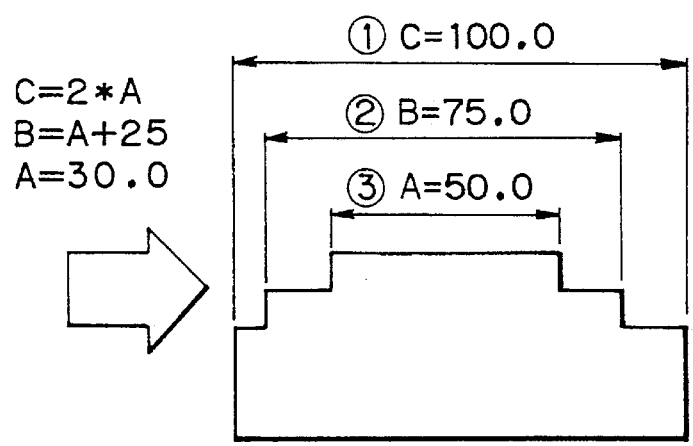

FIGS. 2A and 2B explain a dimension-line editing function of a CAD system according to another prior art.

This system asks a user to enter numeric relationships between dimension lines that are in parallel with one another, an endpoint to change of a reference one of the dimension lines, and a target length of the reference dimension line. According to the data entered, the CAD system calculates target lengths of the parallel dimension lines, and according to results of the calculation, edits drawing data corresponding to the endpoints of the dimension lines.

Namely, the user may define the following numeric relationships when displaying dimension lines (1) to (3) of FIG. 2A:

C=2×A
B=A+25
A=30.0

The system lengthens the dimension line (3), which is a reference dimension line of the numeric relationships, from 30.0 to 50.0 uniformly at both ends thereof. After registering the numeric relationships, the user specifies both ends of the reference dimension line to lengthen, and enters a target length of 50.0 for the dimension line (3), the CAD system calculates a target length of 100.0 for the dimension line (1) and 75.0 for the dimension line (2) according to the registered and entered data. According to results of the calculation, the CAD system edits drawing data corresponding to the dimension lines (1) to (3), as shown in FIG. 2B.

According to the prior art of FIGS. 1A and 1B, a user must specify objective dimension lines one by one. It takes, therefore, a longer time to edit drawing data as the number of objective dimension lines increases.

According to the prior art of FIGS. 2A and 2B, a user is not asked to enter objective dimension lines one by one, but the user must register numeric relationships between the dimension lines. Accordingly, it takes a long time to register the numeric relations and process drawing data according to the numeric relationships.

These prior arts also ask a user to specify an endpoint of the objective dimension line.

Now, CAD systems having dimension-line editing functions according to the first to third aspects of the present invention will be explained with reference to the drawings.

Figure 3:
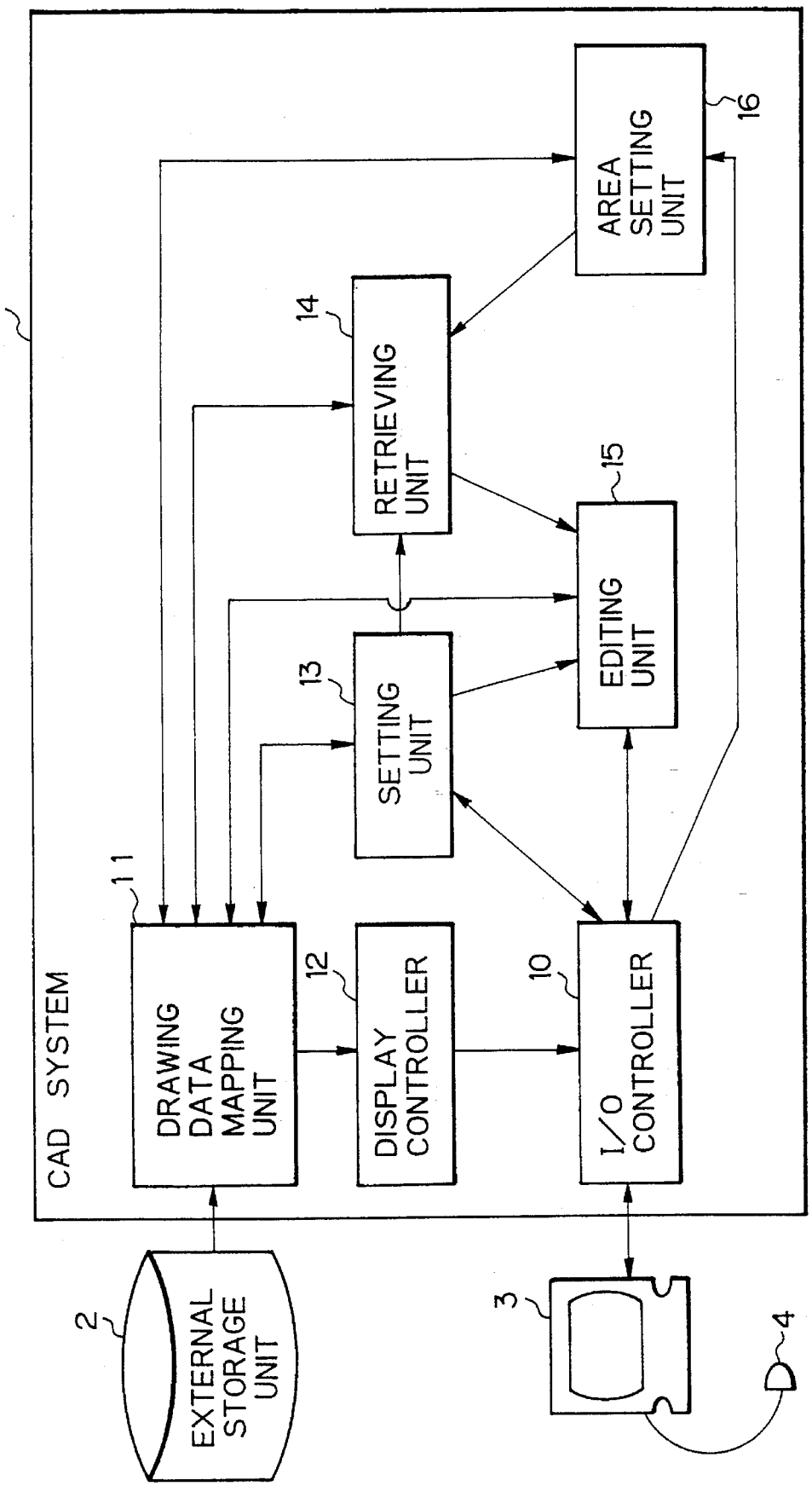
FIG. 3 shows a principle of a CAD system with a dimension-line editing function according to a first aspect of the present invention.

FIG. 3 shows a principle of a CAD system with the dimension-line editing function according to the first aspect of the present invention.

The CAD system 1 has an external storage unit 2 for storing drawing data. A terminal 3 realizes interactive processes with a user. The terminal 3 has an input unit 4 such as a keyboard or a mouse and is used to enter data for editing the drawing data.

The CAD system 1 has an I/O controller 10, a drawing data mapping unit 11, a display controller 12, a setting unit 13, a retrieving unit 14, an editing unit 15, and an area-setting unit 16.

The I/O controller 10 serves as an interface with respect to the terminal 3. The drawing data mapping unit 11 maps the drawing data stored in the external storage unit 2. The display controller 12 displays the mapped drawing data on a display unit of the terminal 3.

The setting unit 13 sets an objective dimension line according to data interactively entered through the terminal 3. The retrieving unit 14 retrieves dimension lines that are in parallel with the objective dimension line. The editing unit 15 edits drawing data corresponding to the objective and retrieved dimension lines. The area setting unit 16 sets an area in which the retrieving unit 16 retrieves dimension lines according to data interactively entered through the terminal 3.

According to the first aspect of the present invention, a user interactively enters data through the terminal 3. The data is sent to the area setting unit 16, which sets a retrieval area in a drawing displayed on the display unit.

After the retrieval area is set, the user interactively specifies through the terminal 3 the objective dimension line among the dimension lines in the displayed drawing. The setting unit 13 sets the objective dimension line. For the sake of easy retrieval by the retrieving unit 14, the objective dimension line may be the shortest one among the dimension lines that are in parallel with one another.

The retrieving unit 14 retrieves from within the retrieval area dimension lines that are in parallel with the objective dimension line.

The user interactively enters, through the terminal 3, a change quantity or a target quantity to be applied to the objective dimension line. According to the change quantity, the editing unit 15 edits drawing data corresponding to the objective dimension line as well as drawing data corresponding to the retrieved dimension lines.

If the user specifies, through the input unit 4, the right end of the objective dimension line during the setting operation of the setting unit 13, the editing unit 15 will edit drawing data corresponding to the right endpoint of the dimension line. If the user specifies the left end of the dimension line, the editing unit 15 will edit drawing data corresponding to the left endpoint of the dimension line. If the user specifies the central part of the dimension line, the editing unit 15 will uniformly edit drawing data corresponding to both endpoints of the dimension line. In this way, the editing unit 15 selectively edits drawing data according to a position specified on the objective dimension line.

In this way, the CAD system according to the first aspect of the present invention asks a user to specify an objective dimension line and the quantity of a change to be made on the objective dimension line. According to these data, the CAD system edits drawing data corresponding to the objective dimension line and dimension lines that are in parallel with the objective dimension line. Accordingly, the CAD system is capable of efficiently editing drawing data involving many dimension lines. The CAD system never asks the user to the specify endpoints of dimension lines to be edited one by one.

Figure 4:
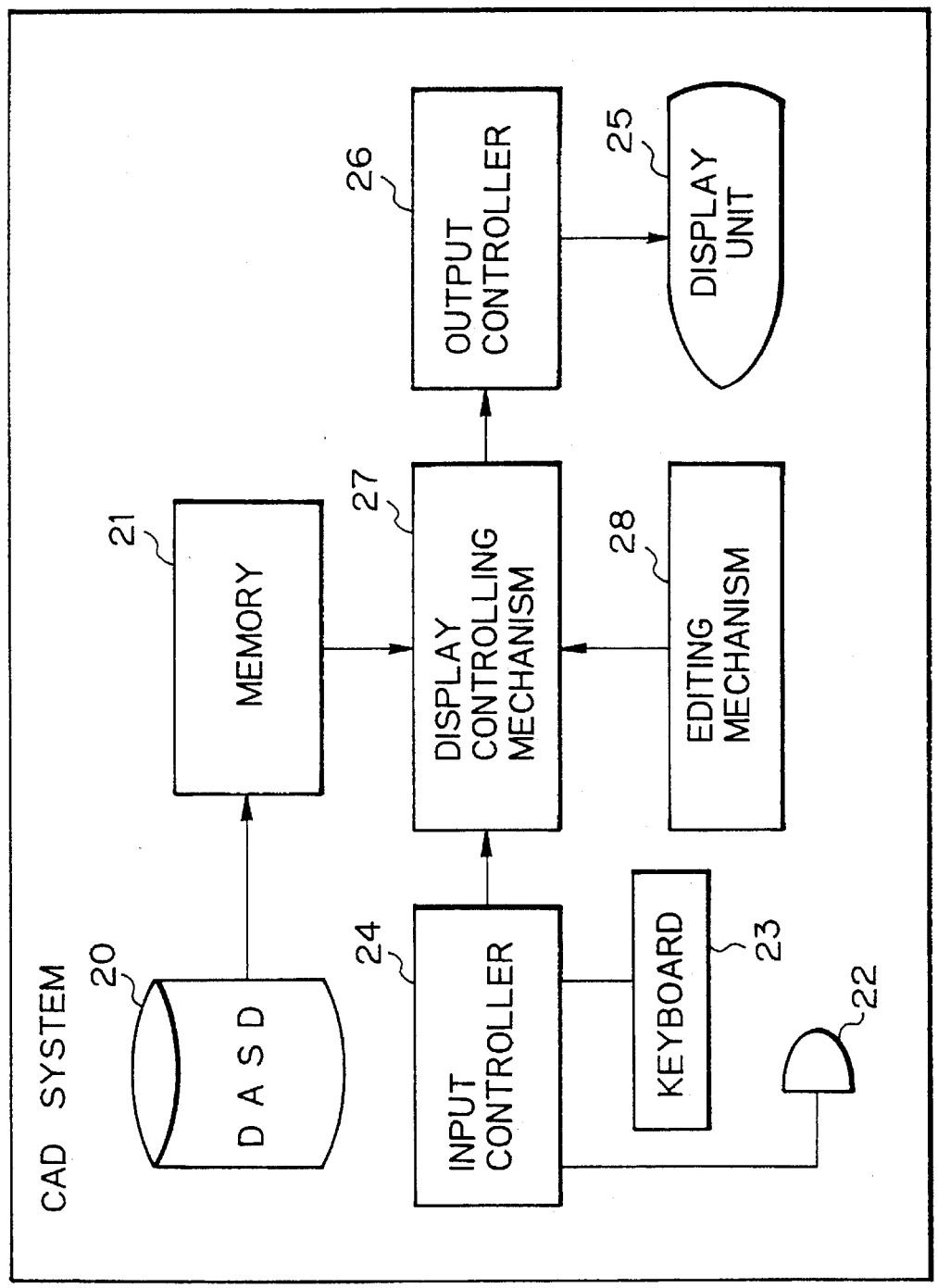
FIG. 4 shows a CAD system embodied on the first aspect of the present invention.

FIG. 4 is a block diagram showing a CAD system embodied on the first aspect of the present invention.

The CAD system has a DASD (Direct Access Storage Device) 20 for storing drawing data prepared by the CAD system, a memory 21 for mapping the drawing data stored in the DASD 20, a mouse 22 serving as an input unit, a keyboard 24 serving as an input unit, an I/O controller 24 for controlling the mouse 22 and keyboard 23, a display unit 25 for displaying drawing data, an output controller 26 for controlling the display unit 25, a display controlling mechanism 27 for controlling drawing data to be displayed, and an editing mechanism 28 for editing the drawing data.

Figure 5:
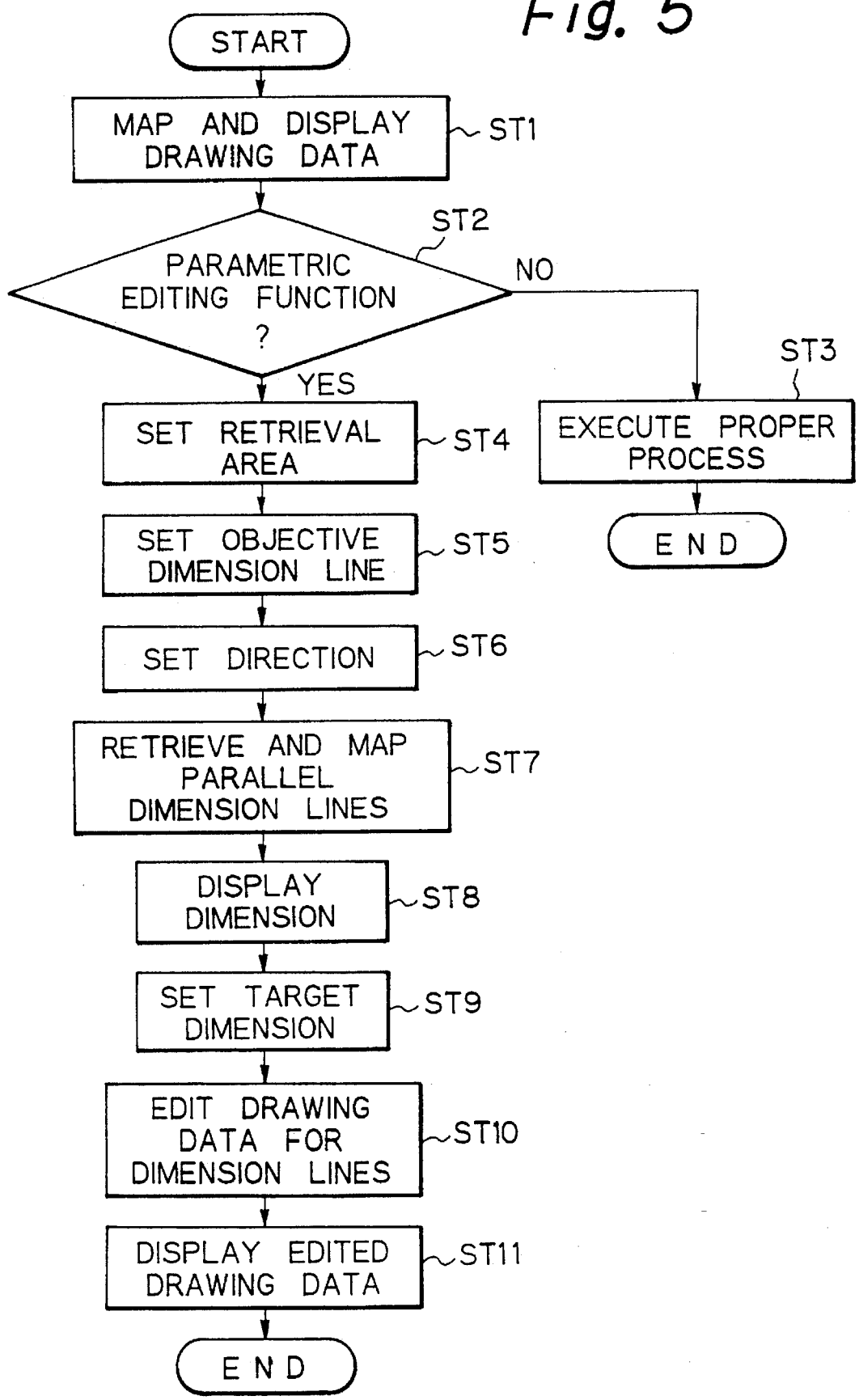
FIG. 5 shows a flow of processes carried out by the CAD system according to the first aspect of the present invention.
Figure 6:
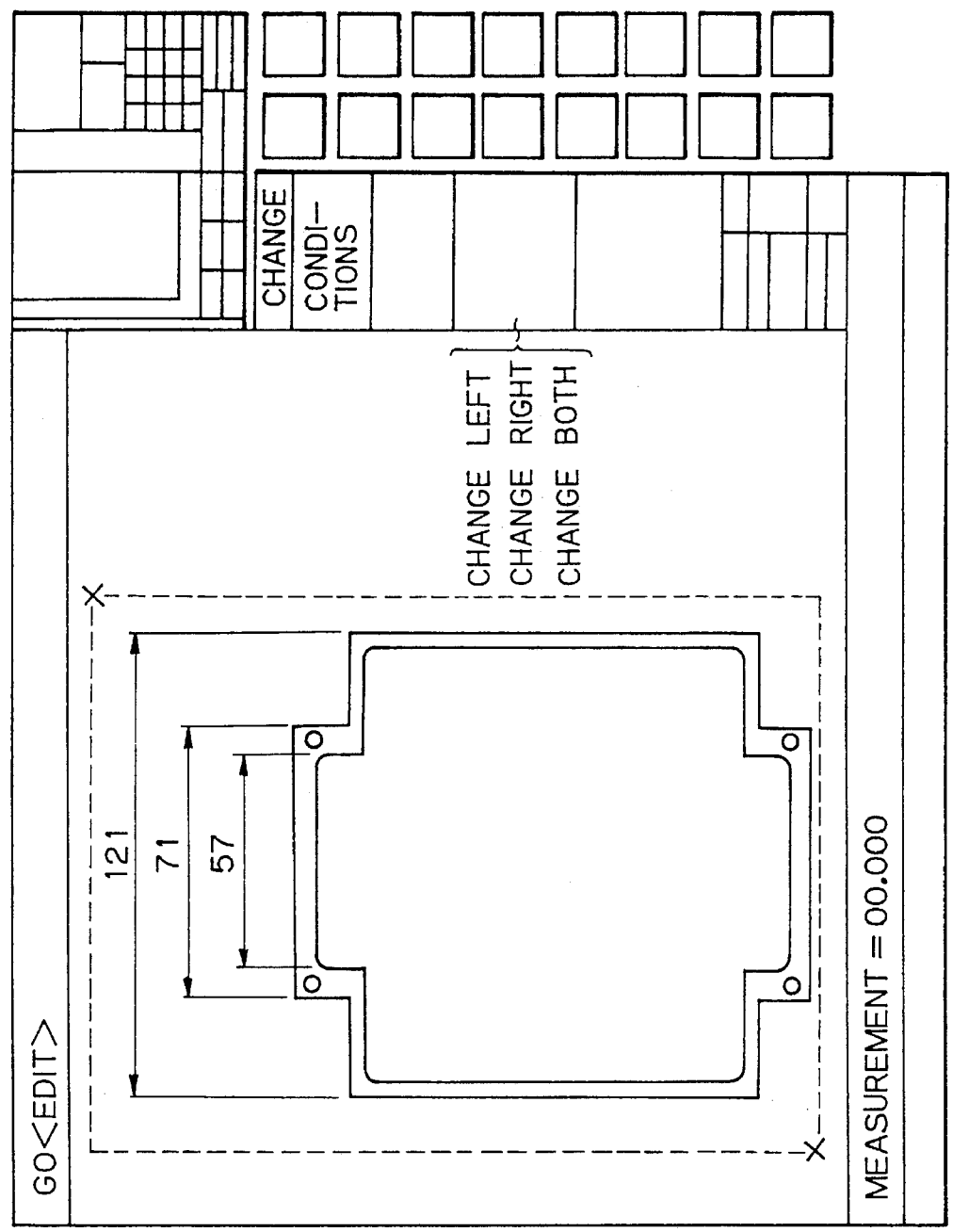
FIG. 6 shows a display screen for explaining a retrieval area setting process in the CAD system according to the first aspect of the present invention.
Figure 7:
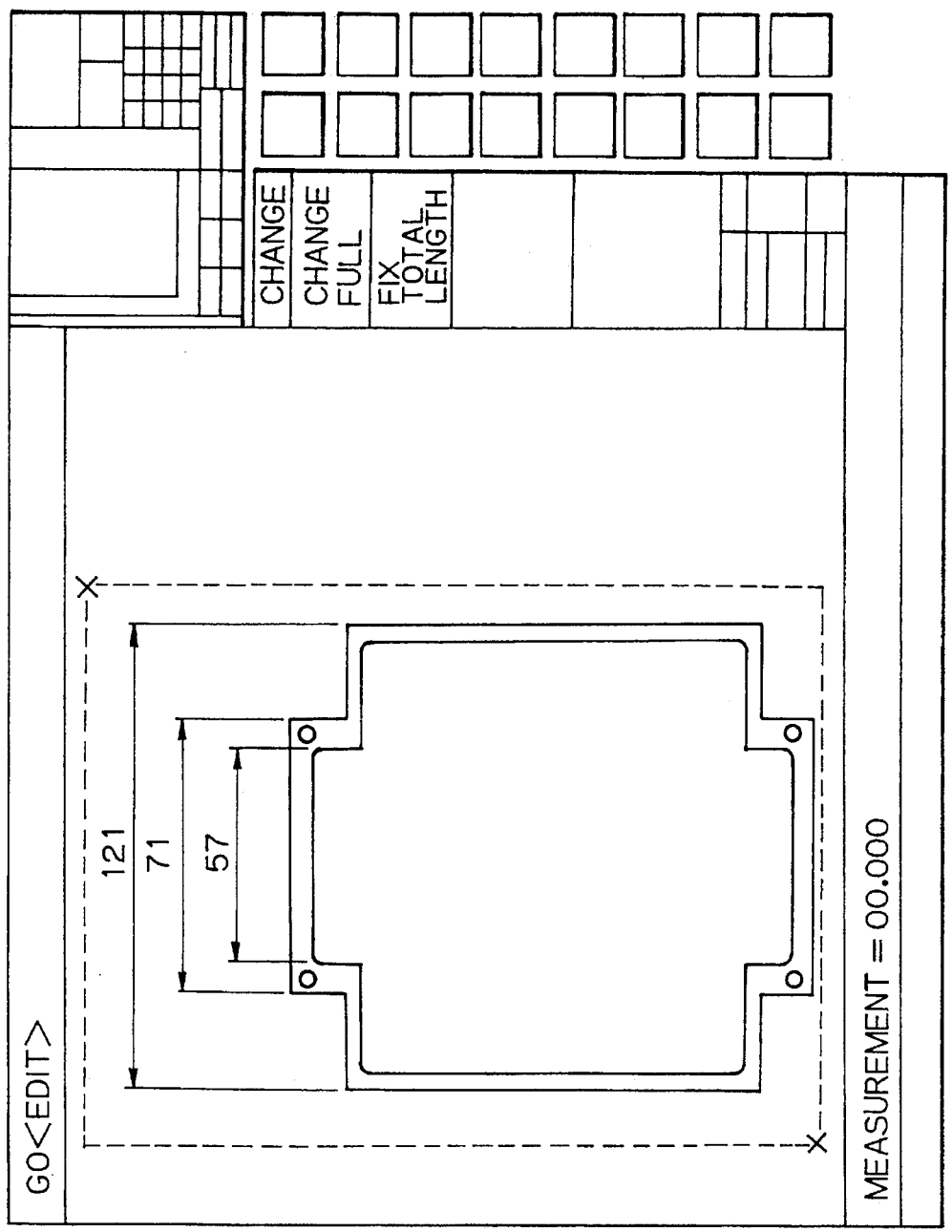
FIG. 7 shows a display screen for explaining a changing process in the CAD system according to the first aspect of the present invention.
Figure 8:
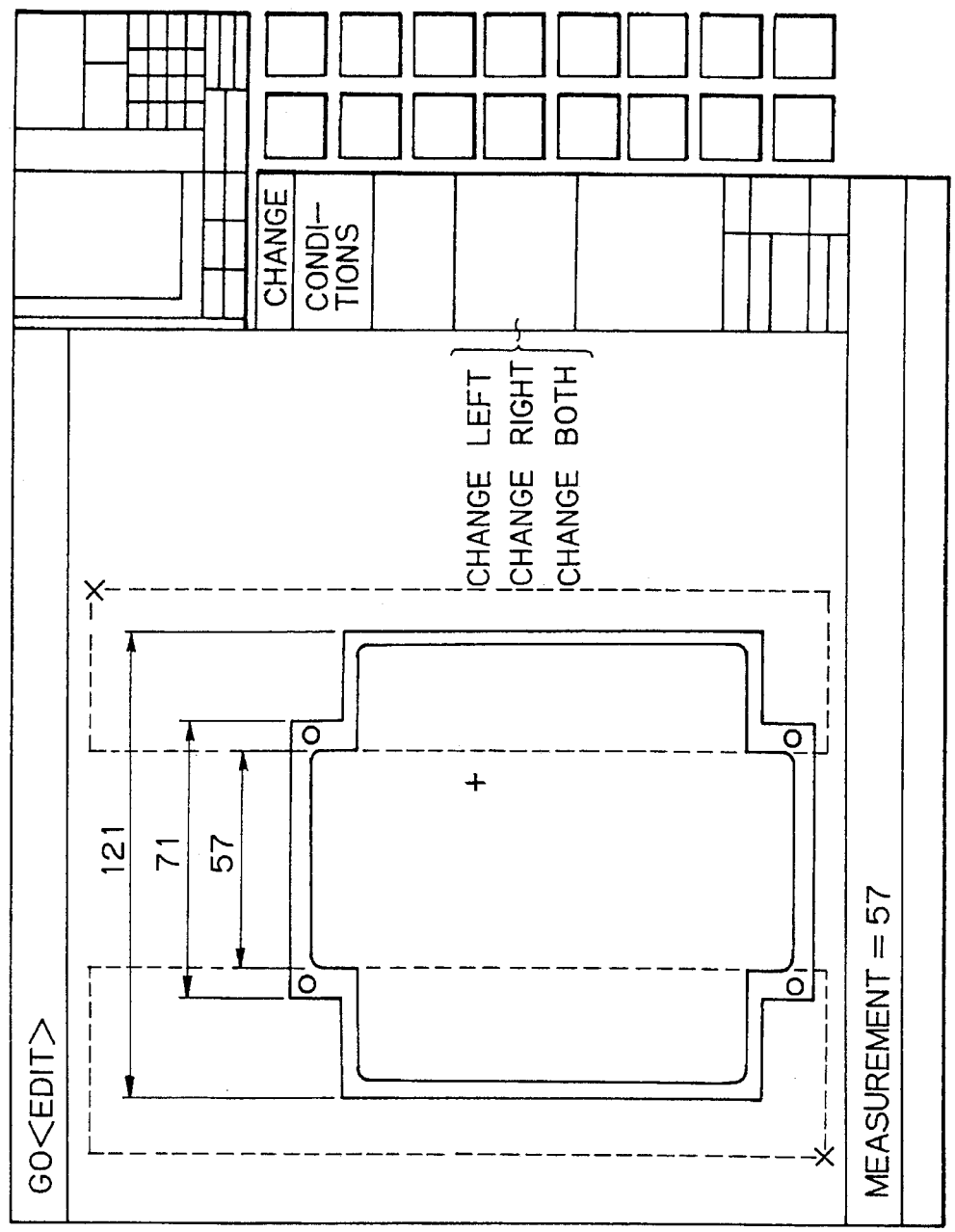
FIG. 8 shows a display screen for explaining an objective dimension line setting process and a parallel dimension line retrieving process in the CAD system according to the first aspect of the present invention.

FIG. 5 shows the flow of drawing data editing processes carried out by the editing mechanism 28 characteristic of the first aspect of the present invention. FIG. 6 shows a display screen for explaining a retrieval-area-setting process, FIG. 7 shows a display screen for explaining a changing process, and FIG. 8 shows a display screen for explaining an objective-dimension-line-setting process and a parallel- dimension-line-retrieving process. All of these processes are carried out by the CAD system according to the first aspect of the present invention.

The drawing data editing processes according to the first aspect of the present invention will be explained in detail with reference to the flowchart of FIG. 5.

In step ST1, the editing mechanism 28 issues a display instruction to the display controlling mechanism 27, so that drawing data to be edited is mapped in the memory 21 and displayed on the display unit 25.

Step ST2 determines whether or not a parametric editing function, to execute the editing process according to the first aspect of the present invention, has been specified. If the parametric editing function has not been specified, step ST3 carries out a proper process to end the editing flow. The parametric editing function may be specified when a user selects, with the mouse 22, a corresponding menu item displayed on the display unit 25.

If the step ST2 determines that the parametric editing function has been specified, step ST4 asks the user to interactively specify a retrieval area in the displayed drawing.

In FIG. 6, the user may specify two points with the mouse 22, to define the retrieval area. When the user selects, with the mouse 22, a menu item "Change," the display shown in FIG. 7 will appear. In FIG. 7, the user may select Change Full or Fix Total Length. The Change Full means to change all dimension lines, and the Fix Total Length means to fix the length of the longest dimension line and change the other dimension lines.

In step ST5, the user interactively selects, with the mouse 22, one of the displayed dimension lines as an objective dimension line. In FIG. 8, the selected dimension line is marked (X) and has a length of 57. The selected objective dimension line may be displayed in flashing red. As a rule, the user must select, as the objective dimension line, the shortest of the dimension lines that are parallel to one another.

Step ST6 determines a lengthening (or shortening) direction of the objective dimension line. The display unit 25 may provide menu items Change Left, Change Right, and Change Both to be selected by the user, with the mouse 22.

Figure 9:
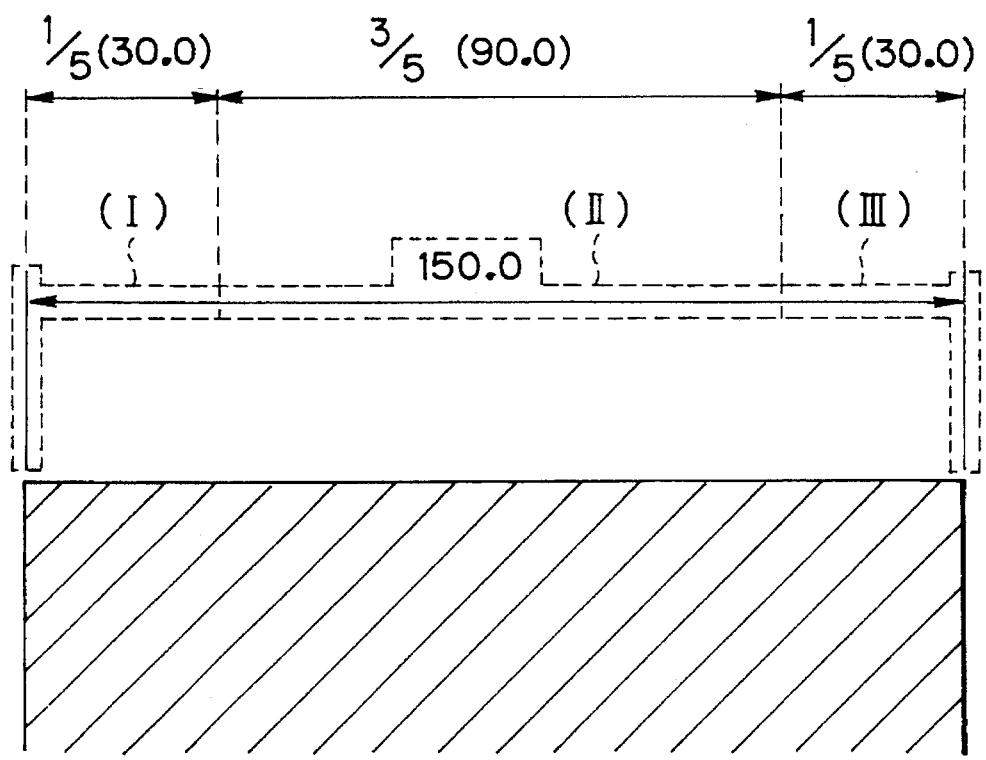
FIG. 9 explains a dimension line lengthening (or shortening) direction determining process in the CAD system according to the present invention.

FIG. 9 shows an example of the dimension line lengthening (or shortening) direction determining process in the CAD system according to the present invention.

When the user specifies, with the mouse 22, a left extension line, or the left one-fifth part (I) of the objective dimension line, the right endpoint of the dimension line is fixed, and the left end of the dimension line is lengthened or shortened. When a right extension line, or the right one-fifth part (III) of the objective dimension line is specified, the left endpoint is fixed, and the right end is lengthened or shortened. When the central three-fifths part (II) of the objective dimension line, or the numeric part indicating the length of the dimension line is specified, both end of the dimension line are uniformly lengthened or shortened.

In this way, as an objective dimension line is set, the lengthening (or shortening) direction of the dimension line is automatically determined.

When the numeric part of a dimension line is specified, the lengthening (or shortening) direction is determined according to the starting position of the numeric part, e.g., the position of the leftmost numeral in the numeric part. If the starting position is in the left one-fifth part (I) of FIG. 9, the right endpoint of the dimension line is fixed, and the left end of the dimension line is lengthened or shortened. The same rules are applicable for vertical dimension lines.

Step ST7 retrieves, in the retrieval area, dimension lines that are parallel to the objective dimension line. The objective and retrieved dimension lines are displayed in red. At the same time, drawing data corresponding to these dimension lines are mapped in a work area of the memory 21. As indicated in dotted frames in FIG. 8, the dimension lines that are parallel to the objective dimension line have their endpoints in the retrieval area.

Step ST8 displays the present length of the objective dimension line at a lower left part of the display, as shown in FIG. 8. A cursor is positioned on the displayed length.

In step ST9, the user interactively enters a target length for the objective dimension line. If the user wants to change the length of the dimension line from 57 to 100, for example, the user enters the length 100 through the keyboard 23.

Step ST10 edits drawing data corresponding to an endpoint of the objective dimension line, to change the length of the dimension line according to the target length in the set lengthening (or shortening) direction. At the same time, drawing data corresponding to the endpoints of the retrieved parallel dimension lines are edited, to change their lengths in the same lengthening (or shortening) direction by the same change quantity as for the objective dimension line.

Namely, to change the length of the objective dimension line from 57 to 100 in the left, the drawing data corresponding to the left endpoints of the objective and retrieved dimension lines are each moved in the left by a change length of 43. When the lengthening (or shortening) direction is right, the drawing data for the right endpoints of the objective and retrieved dimension lines are each moved by the change length of 43. When the dimension lines are changed in both directions, the drawing data for both the endpoints of the objective and retrieved dimension lines are each moved by a change length of 21.5.

Figure 10:
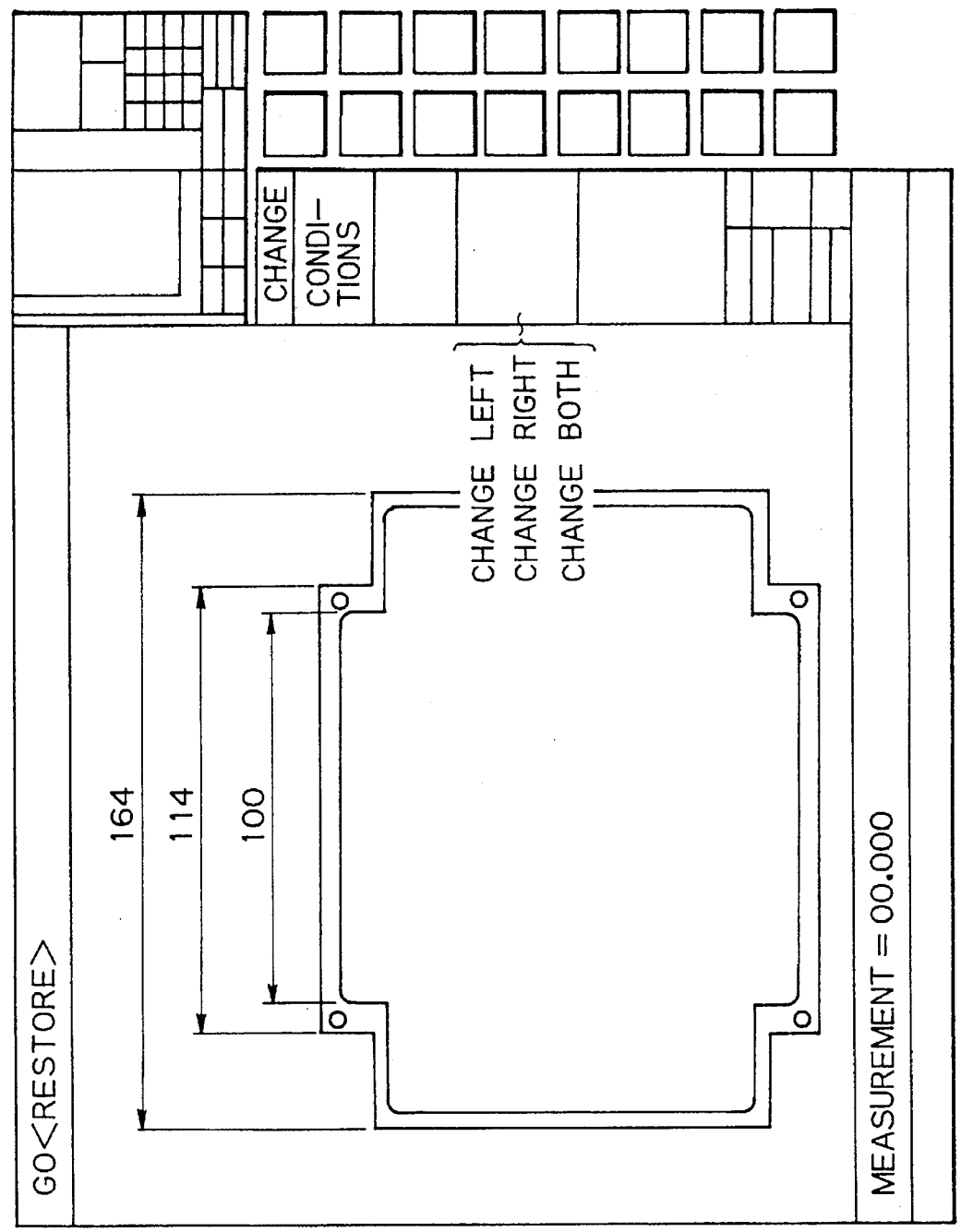
FIG. 10 shows a display screen for explaining an edited drawing displaying process in the CAD system according to the first aspect of the present invention.

Step ST11 displays the edited drawing data, as shown in FIG. 10, to complete the editing flow. In FIG. 10, a menu item Change may be selected to start the parametric editing function, a menu item Change Left to lengthen (or shorten) a given dimension line on the left, a menu item Change Right to lengthen (or shorten) a given dimension line in the right, and a menu item Change Both to lengthen (or shorten) a given dimension line in both directions.

Figure 11A:
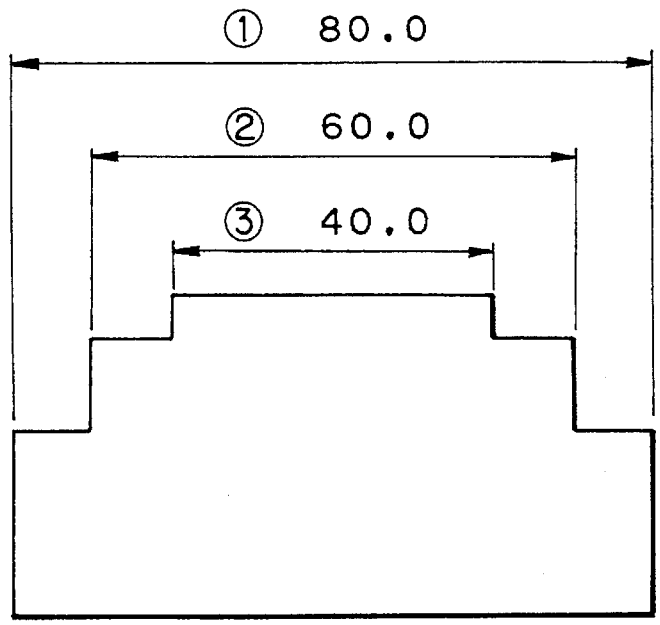
FIGS. 11A and 11B explain a drawing data editing process in the CAD system according to the first aspect of the present invention.
Figure 11B:
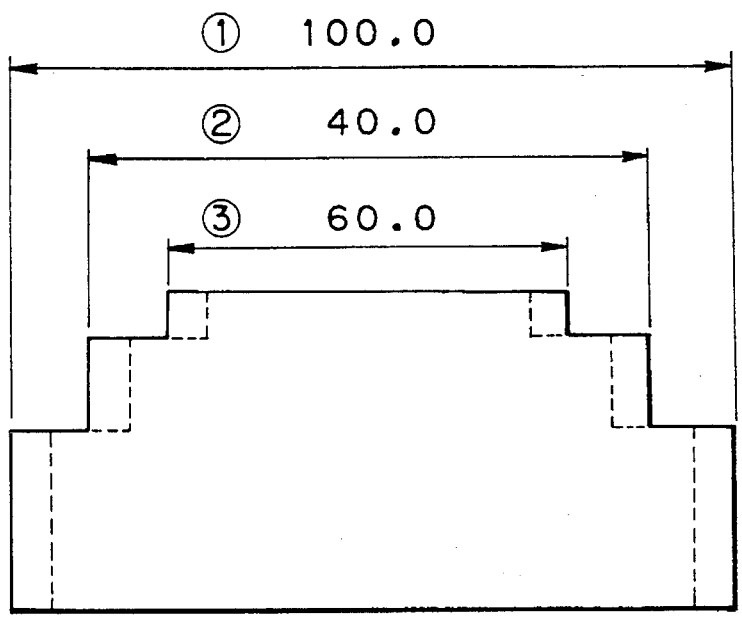

FIGS. 11A and 11B explain another example of the drawing-data-editing process in the CAD system according to the first aspect of the present invention.

The flow of processes of FIG. 5 simultaneously edits parallel dimension lines of FIG. 11A into those of FIG. 11B.

The first aspect of the present invention is not limited to the above explanation. This aspect of the present invention is applicable not only to dimension lines indicating lengths but also to angle indicators.

In the above explanation, the lengths of dimension lines that are in parallel with an objective dimension line are equally changed by a change quantity set for the objective dimension line. The lengths of these parallel dimension lines may be changed according to ratios of the lengths of the parallel dimension lines to the length of the objective dimension line.

As explained above, the CAD system according to the first aspect of the present invention only asks a user to specify an objective dimension line and a change quantity applied to the objective dimension line. According to these data, the CAD system edits not only drawing data for the objective dimension line but also drawing data for dimension lines that are in parallel with the objective dimension line. This CAD system never asks the user to specify endpoints of dimension lines one by one, and efficiently edits drawing data involving many dimension lines.

FIGS. 12A to 12D explain the problems of a CAD system employing a conventional dimension-line editing function.

In FIG. 12A, a displayed dimension line is to be changed from 30.0 to 50.0. If the left endpoint of the dimension line is specified, the dimension line will be edited into the one shown in FIG. 12B. If both endpoints of the dimension line are specified, the dimension line will be edited into the one shown in FIG. 12C. If the right endpoint of the dimension line is specified, the dimension line will be edited into the one shown in FIG. 12D. According to this prior art, a user is unable to visually confirm the changing direction of any objective dimension line beforehand. In addition, the user must specify every endpoint of dimension lines to be edited.

Figure 13:
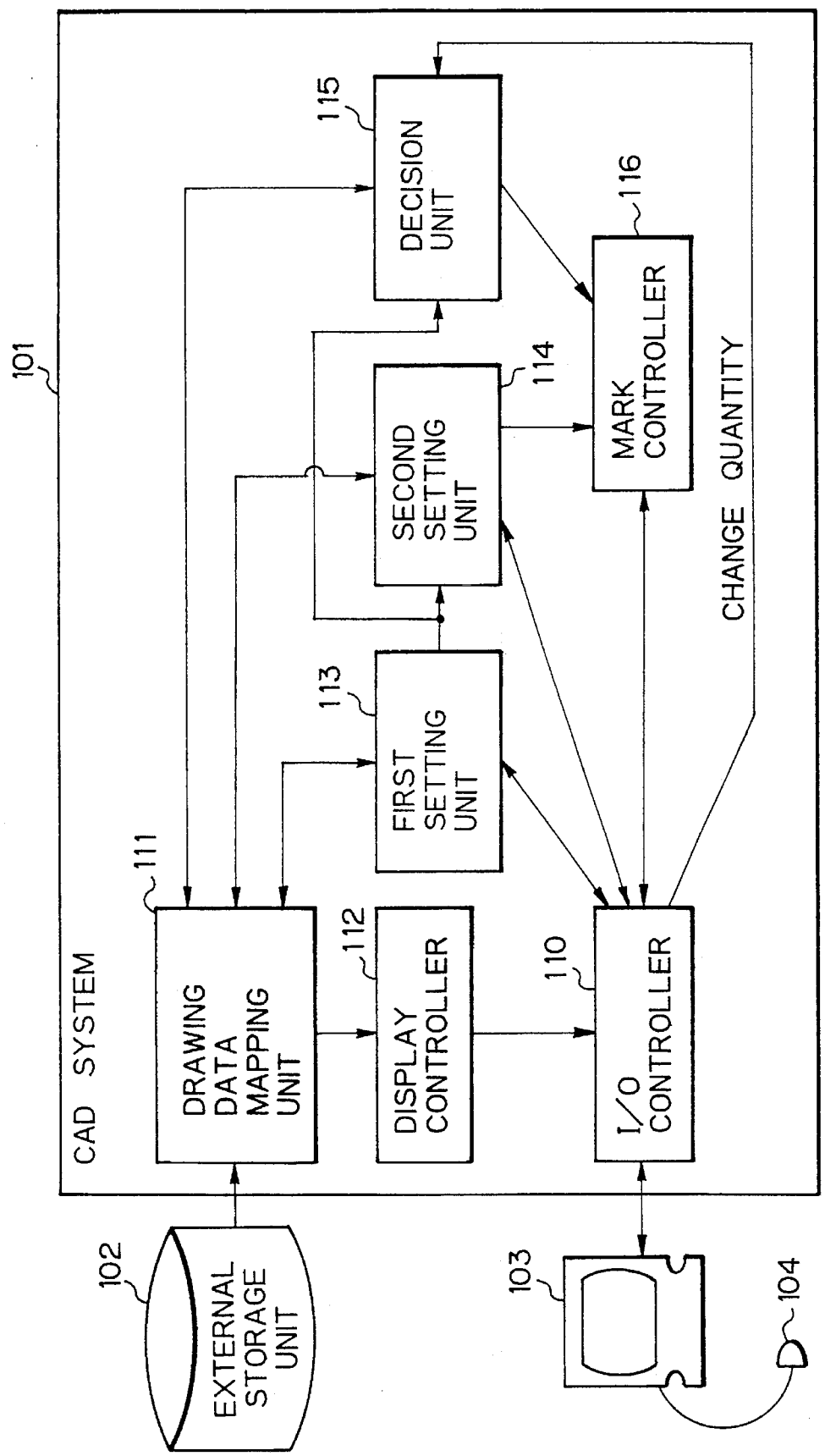
FIG. 13 shows a principle of a CAD system with a dimension-line editing function according to a second aspect of the present invention.

FIG. 13 is a block diagram showing a principle of a CAD system with the dimension-line editing function according to the second aspect of the present invention.

The CAD system 101 has an external storage unit 102 for storing drawing data. A terminal 103 serves as a interactive user unit. The terminal 103 has an input unit 103, such as a keyboard and a mouse, used by a user to enter data necessary for editing the drawing data.

The CAD system has an I/O controller 110, a drawing data mapping unit 111, a display controller 112, a first setting unit 113, a second setting unit 114, a decision unit 115, and a mark display controller 116.

The I/O controller 110 serves as an interface for the terminal 103. The drawing data mapping unit 111 maps the drawing data stored in the external storage unit 102. The display controller 112 displays the mapped drawing data on a display unit of the terminal 103.

The first setting unit 113 sets an objective dimension line according to data interactively entered through the terminal 103. According to the positional data of the objective dimension line, the first setting unit 113 may set at least one endpoint of the dimensional line as an endpoint to be edited.

The second setting unit 114 sets at least one endpoint of the objective dimension line as an endpoint to be edited, according to data interactively entered through the terminal 103.

The decision unit 115 determines the changing direction of the objective dimension line.

The mark display controller 116 displays a direction mark according to the endpoint set by the second setting unit 114 (or by the first setting unit 113).

According to the second aspect of the present invention, a user interactively selects a dimension line in a drawing displayed on the display unit. The first setting unit 113 sets the selected dimension line as an objective dimension line. At this time, if the user specifies with the input unit 104, the right end of the objective dimension line, the first setting unit 113 may set the right endpoint of the dimension line as an endpoint to be changed. If the left endpoint of the dimension line is specified, the unit 113 may set the left endpoint of the dimension line as the endpoint to be changed. If the central part of the dimension line is specified, the unit 113 may set both endpoints of the dimension line as endpoints to be changed. In this way, the first setting unit 113 may automatically select at least one endpoint of a given dimension line according to the positional data of the dimension line.

When the first setting unit 113 does not carry out the process of selecting an endpoint of the objective dimension line, the second setting unit 114 sets one or both of the endpoints of the objective dimension line, according to an instruction interactively provided by the user through the terminal 103. If the user selects the right endpoint of the objective dimension line, the unit 114 sets the right endpoint as the endpoint to be changed. If the left endpoint of the dimension line is selected, the unit 114 sets the left endpoint as the endpoint to be changed. If both endpoints are selected, the unit 114 sets both endpoints as endpoints to be changed.

When a quantity instructed by the user for the objective dimension line is a target quantity, the decision unit 115 determines the changing direction of the objective dimension line according to the target quantity and the present length of the dimension line. When the instructed quantity is a change quantity, the decision unit 115 determines the changing direction of the objective dimension line according to the sign of the change quantity.

According to the determined direction, the mark display controller 116 displays a direction mark, such as an arrow mark, indicating the determined changing direction in the vicinity of the selected endpoint of the objective dimension line.

The CAD system according to the second aspect of the present invention enables a user to edit drawing data for an objective dimension line while visually confirming the changing direction of the dimension line. This improves the operability of the CAD system. The CAD system never asks the user to specify the endpoints of dimension lines, to be edited, one by one.

Figure 14:
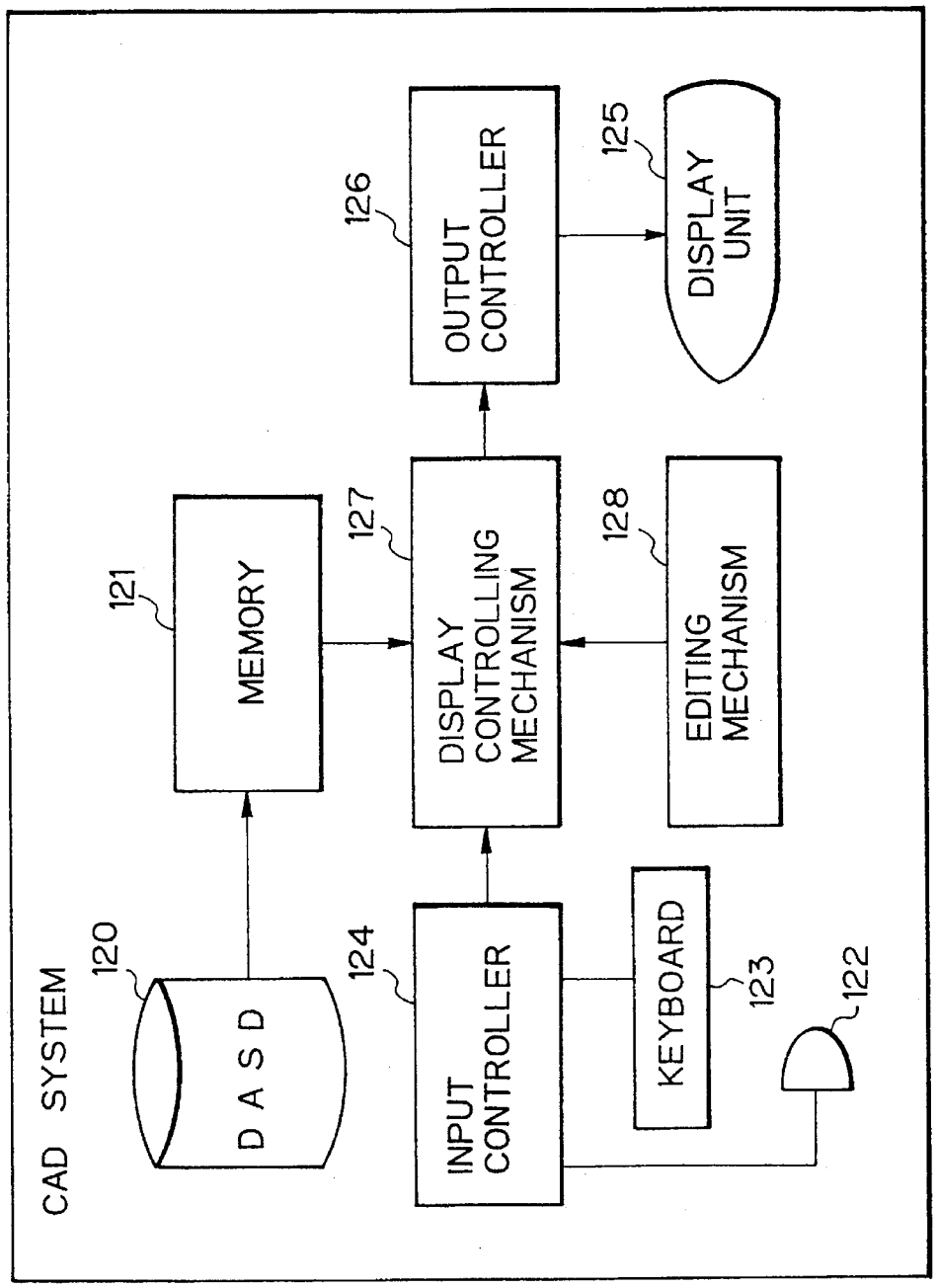
FIG. 14 shows a CAD system embodied on the second aspect of the present invention.

FIG. 14 is a block diagram showing a CAD system embodied on the second aspect of the present invention.

The CAD system has a DASD (Direct Access Storage Device) 120 for storing drawing data prepared by the CAD system, a memory 121 for mapping the drawing data stored in the DASD 120, a mouse 122 serving as an input unit, a keyboard 123 serving as an input unit, an input controller 124 for controlling the mouse 122 and keyboard 123, a display unit 125 for displaying drawing data, an output controller 126 for controlling the display unit 125, a display controlling mechanism 127 for controlling drawing data to be displayed, and an editing mechanism 128 for editing the drawing data.

Figure 15:
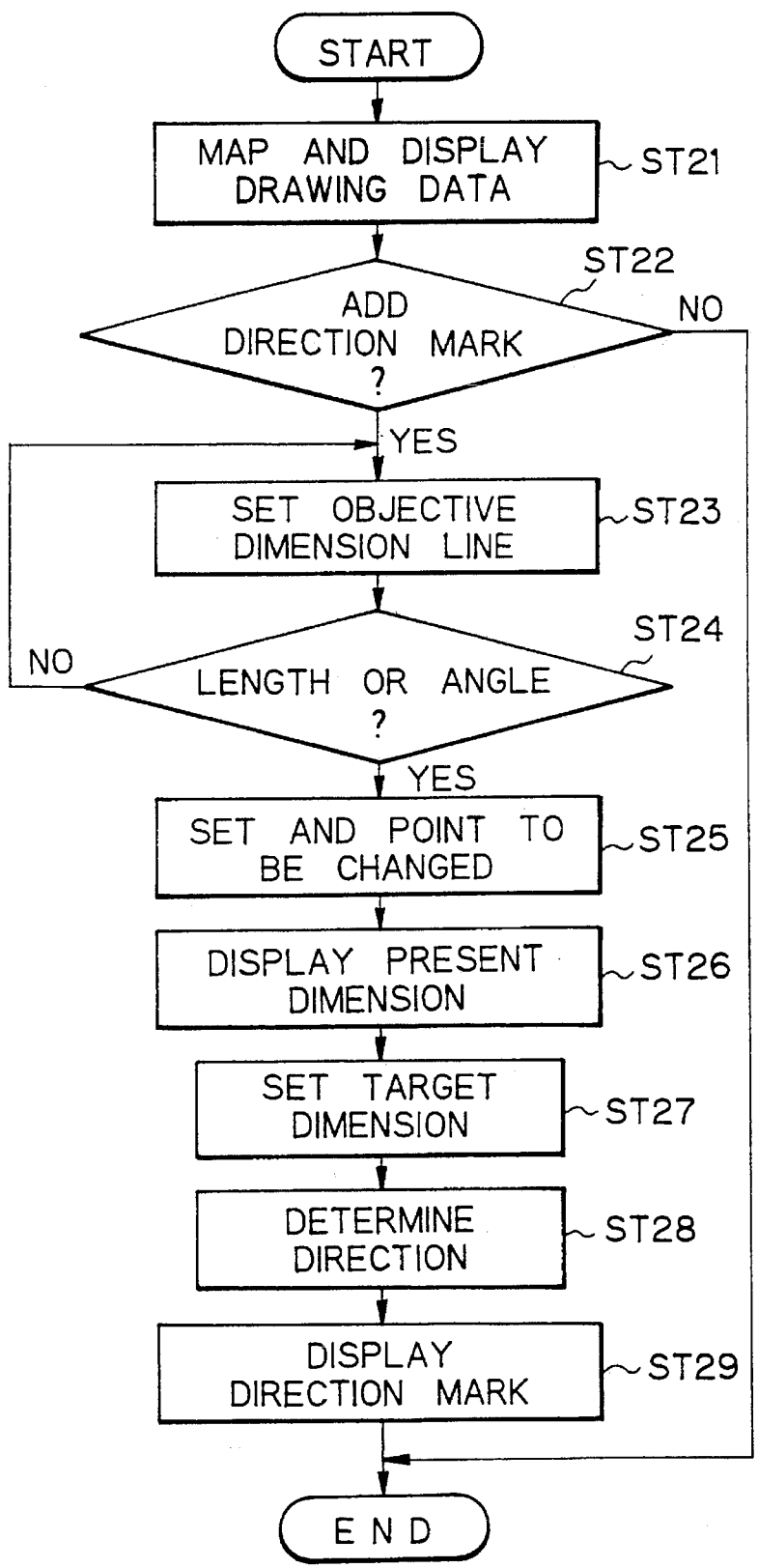
FIG. 15 shows a flow of processes carried out by the CAD system according to the second aspect of the present invention.

FIG. 15 shows the flow of drawing-data-editing-processes carried out by the editing mechanism 128 characteristic of the second aspect of the present invention.

The direction mark adding process according to the second aspect of the present invention will be explained in detail with reference to the flowchart of FIG. 15.

In step ST21, the editing mechanism 128 issues a display instruction to the display controlling mechanism 127, so that drawing data to be edited are mapped in the memory 121 and displayed on the display unit 125.

Step ST22 determines whether or not the direction mark adding function has been specified. If the function is not specified, the flow ends without executing the direction mark adding process. To start this function, a user may use the mouse 122 to specify a corresponding menu item on the display unit.

If the step ST22 determines that the direction mark adding function has been specified, step ST23 asks the user to interactively specify with the mouse 122 an objective dimension line in a drawing displayed on the display unit 125. The objective dimension line may be displayed in flashing red.

Figure 16:
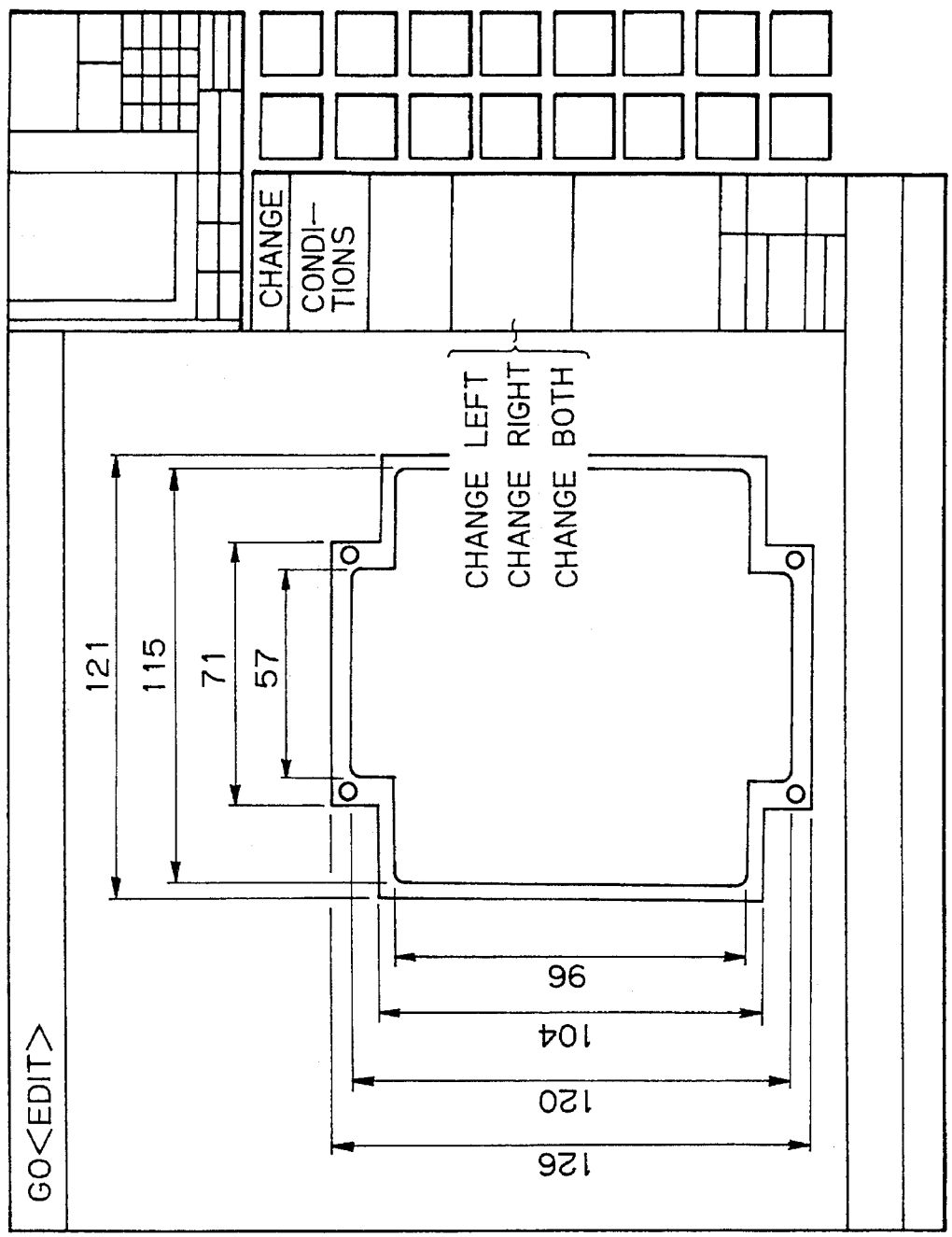
FIG. 16 shows a display screen for explaining a drawing data displaying process in the CAD system according to the second aspect of the present invention.

In FIG. 16, the selected objective dimension line is marked with an X and has a length of 57.

Step ST24 determines whether the objective dimension line represents a length or an angle, or merely an extension line, and waits until a dimension line representing a length or an angle is set to achieve the second aspect of the present invention.

When the step ST24 determines that the objective dimension line is such a dimension line, step ST25 asks the user to specify an endpoint of the objective dimension line to be changed. Namely, the step ST25 sets an endpoint to indicate the lengthening (or shortening) direction of the objective dimension line.

The display unit may provide a menu item Change Left for selecting a left endpoint of a given dimension line, Change Right for selecting a right endpoint of a given dimension line, and Change Both for selecting both endpoints of a given dimension line. The user may select one of these menu items with the mouse 122, to specify the changing direction.

As explained with reference to FIG. 9, when a left extension line, or the left one-fifth part (I) of the objective dimension line is specified, the right endpoint of the dimension line is fixed, and the left end of the dimension line is lengthened or shortened. When a right extension line, or the right one-fifth part (III) of the objective dimension line is specified, the left endpoint is fixed, and the right end of the dimension line is lengthened or shortened. When the central three-fifths part (II) of the objective dimension line, or a numeric part indicating the length of the dimension line is specified, both the endpoints of the dimension line are uniformly lengthened or shortened. In this way, as an objective dimension line is set (selected), the lengthening (or shortening) direction of the dimension line is automatically set.

When the numeric part of a dimension line is specified, the lengthening (or shortening) direction is determined according to the starting position of the numeric part, e.g., the position of the leftmost numeral in the numeric part. If the starting position is in the left one-fifth part (I) of FIG. 9, the right endpoint of the dimension line is fixed, and a left end of the dimension line is lengthened or shortened. The same rules are applicable for vertical dimension lines.

Figure 17:
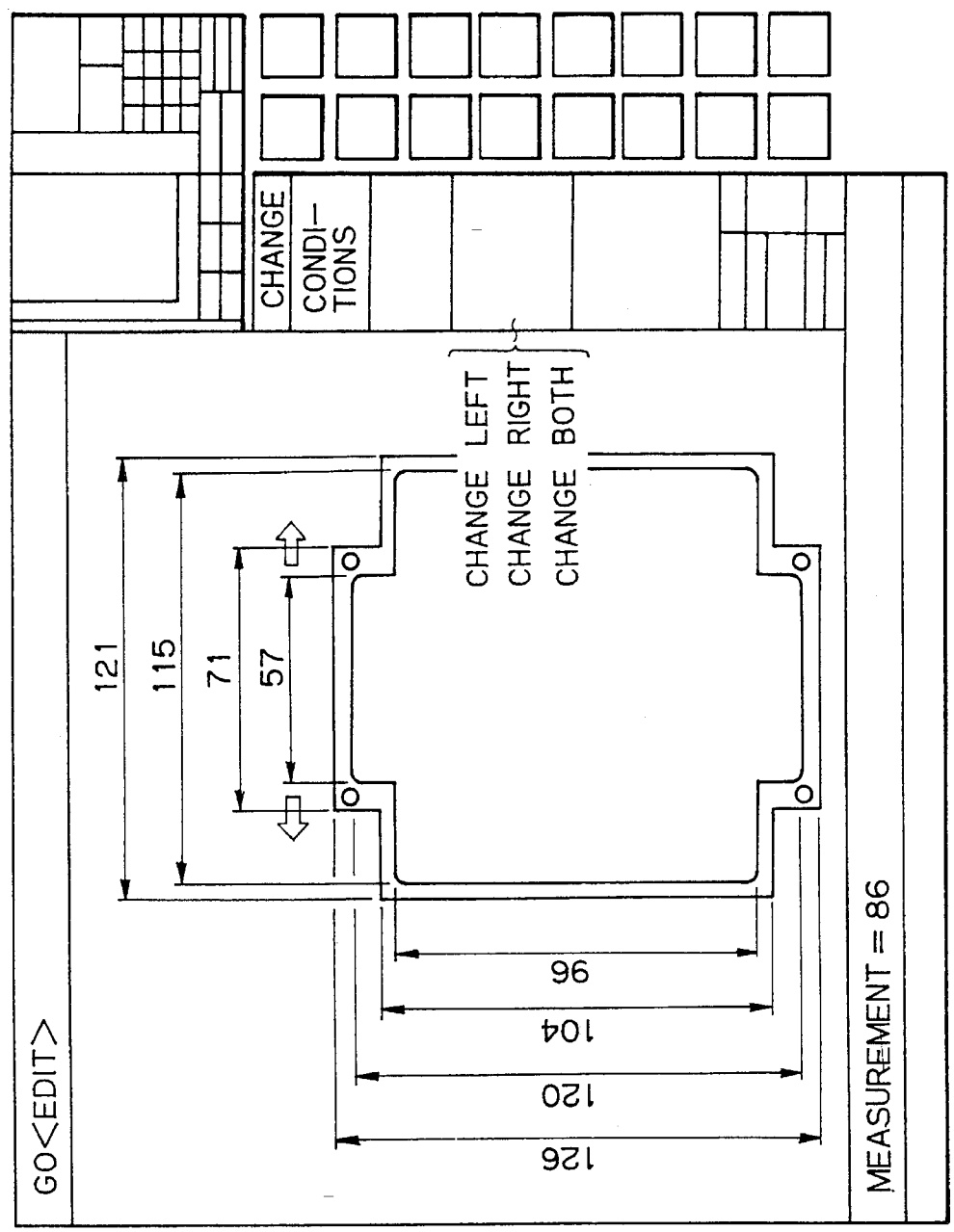
FIG. 17 shows a display screen for explaining a dimension line lengthening (or shortening) mark displaying process in the CAD system according to the second aspect of the present invention.

FIG. 16 shows a display screen for explaining the drawing data displaying process in the CAD system according to the second aspect of the present invention. FIG. 17 shows a display screen for explaining a direction mark displaying process in the CAD system according to the second aspect of the present invention.

Step ST26 of FIG. 15 displays the present dimensional quantity (the length or the angle) of the objective dimension line at a lower left part of the display, as shown in FIG. 17. The cursor is positioned on the displayed dimensional quantity.

In step ST27, the user interactively enters a target dimensional quantity for the objective dimension line. For example, to change the length of the objective dimension line from 57 to 86 as shown in FIG. 16, the user enters the target length of 86 through the keyboard 123.

Step ST28 determines the changing direction of the objective dimension line according to the present dimensional quantity and target dimensional quantity thereof. Since the present length of the objective dimension line is 57 in FIG. 16 and the target length is 86, the step ST28 lengthens the objective dimension line. In this way, if the target dimensional quantity should be increased, the objective dimension line is lengthened, and if the target dimensional quantity should be decreased, the objective dimension line is shortened.

Step ST29 displays an arrow mark to indicate the changing direction in the vicinity of the endpoint of the objective dimension line set in the step ST25. For example, with the present length of the objective dimension line being 57 as shown in FIG. 16 and the target length thereof being 86, the step ST25 may set both endpoints of the objective dimension line as endpoints to be changed. In this case, outward arrow marks are displayed in the vicinities of both the endpoints of the objective dimension line, as shown in FIG. 17.

After confirming the arrow marks, the user may start to change the length of the objective dimension line to the target length.

In FIG. 17, the menu item Change Left may be selected to change the left endpoint of a given dimension line, the menu item Change Right may be set (selected) to change the right endpoint of a given dimension line, and the menu item Change Both may be selected to change both end points of a given dimension line.

Figure 20A:
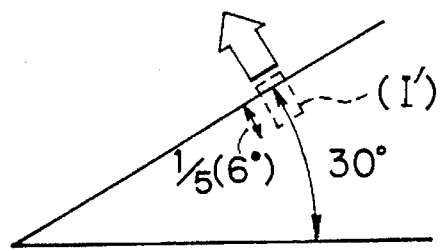
FIGS. 20A to 20C explain an angle increasing (or reducing) mark displaying process in the CAD system according to the second aspect of the present invention.
Figure 20B:
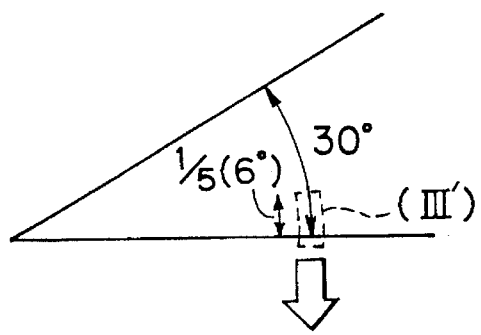
Figure 20C:
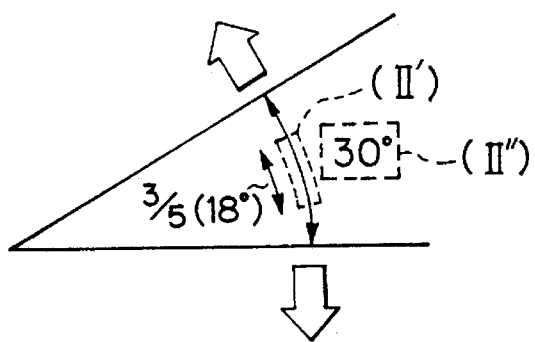

FIGS. 18A to 18G explain a dimension line lengthening mark displaying process, FIGS. 19A to 19G explain a dimension line shortening mark displaying process, and FIGS. 20A to 20C explain an angle widening (or narrowing) mark displaying process. All of these processes are carried out by the CAD system according to the second aspect of the present invention.

When a dimension line is lengthened according to the flow of FIG. 15, an outward arrow mark is displayed for an endpoint of the dimension line to be changed, as shown in FIGS. 18A to 18G.

When a dimension line is shortened, an inward arrow mark is displayed for an endpoint of the dimension line to be changed, as shown in FIGS. 19A to 19G. A user can edit drawing data while visually confirming the editing work.

The second aspect of the present invention is not limited to the above explanation. Although the second aspect of the present invention explained above processes dimension lines indicating the lengths of straight lines, the present invention is applicable to dimension lines indicating angles as shown in FIGS. 20A to 20C.

When an upper one-fifth part (I') of an angular dimension line, which is a line for indicating an angle in the drawing, is specified as shown in FIG. 20A, the lower endpoint of the dimension line is fixed, and the upper end thereof is changed. When the lower one-fifth part (III') of an angular dimension line is specified as shown in FIG. 20B, the upper endpoint of the dimension line is fixed, and the lower endpoint thereof is changed. When the central three-fifths (II') of an angular dimension line is specified as shown in FIG. 20C, the dimension line is uniformly changed at both ends. In this way, as an objective angular dimension line (which is the line for indicating the angle in the drawing) is set, the change of the dimension line is automatically set.

When the numeric part (II") of an angular dimension line is specified, the change in the dimension line is determined according to the starting position of the numeric part, e.g., the position of the leftmost numeral in the numeric part. If the starting position is in the central three-fifths part (II'), the dimension line is changed equally at both ends.

As explained above, the CAD system according to the second aspect of the present invention enables a user to edit drawing data while visually confirming the direction of a dimension line to be edited. This improves workability. The CAD system never asks the user to specify the endpoints, of dimension lines to be changed, one by one.

Figure 21A:
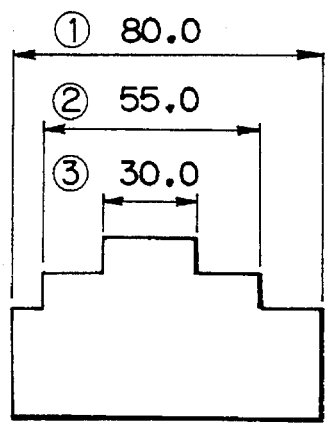
FIGS. 21A and 21B explain a drawing data editing process in a CAD system having a conventional dimension-line editing function.
Figure 21B:
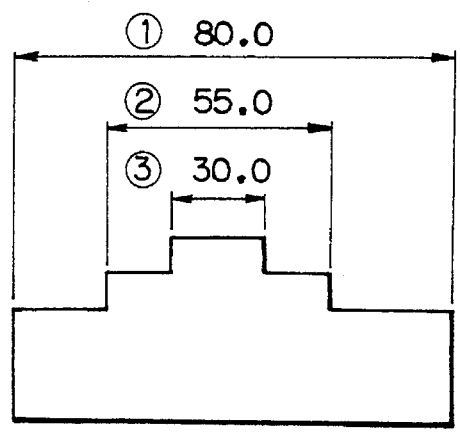
Figure 22A:
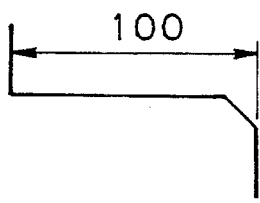
FIGS. 22A and 22B explain a process of lengthening a dimension line involving a chamfer in a CAD system with a conventional dimension-line editing function.
Figure 22B:
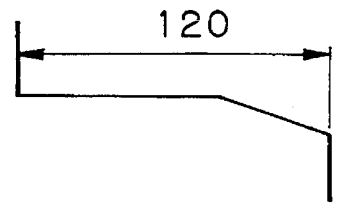
Figure 23A:
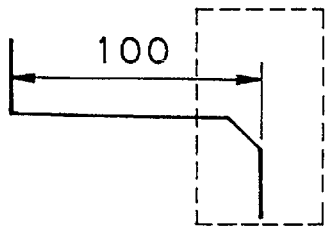
FIGS. 23A and 23B explain a process of lengthening a dimension line involving a chamfer in a CAD system with another conventional dimension-line editing function.
Figure 23B:
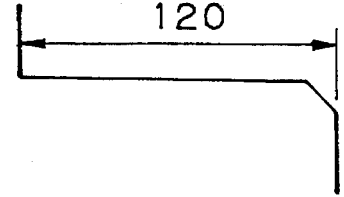

FIGS. 21A and 21B explain a drawing data editing process in a CAD system having a dimension-line editing function according to a prior art. FIGS. 22A and 22B explain a process of lengthening a dimension line involving a chamfer according to the prior art. FIGS. 23A and 23B explain another process of lengthening a dimension line involving a chamfer according to the prior art.

In FIG. 21A, a dimension line (1) is changed from 60.0 to 80.0 equally in both directions. According to the conventional CAD system, a user must specify the dimension line (1) as an objective dimension line. The user must specify that both ends of the dimension line are changed. The user must enter 80.0 as a target length of the dimension line. According to these data, the CAD system edits the dimension line (1) to the one shown in FIG. 21B.

If the objective dimension line involves a chamfer as shown in FIG. 22A, the chamfer will be deformed as shown in FIG. 22B.

Accordingly, the conventional CAD system may ask the user to specify two dimension lines defining the chamfer and the target lengths of these dimension lines, or the CAD system may ask the user to specify the chamfer as a fixed part, to preserve the shape of the chamfer.

According to this prior art, a user must specify two objective dimension lines, or specify a chamfer as a fixed part each time. This results in inefficacy in editing drawing data involving chamfers. There is another problem that a user must specify every endpoint of the dimension lines to be edited.

FIG. 24 is a block diagram showing a principle of a CAD system with the dimension-line editing function according to the third aspect of the present invention.

The CAD system 201 has an external storage unit 202 for storing drawing data, a terminal 203 for realizing interactive processes with a user, and an input unit 204 such as a keyboard and a mouse used by the user to enter data necessary for editing drawing data.

The CAD system 201 has an I/O controller 210, a drawing data mapping unit 211, a display controller 212, a first setting unit 213, a second setting unit 214, a decision unit 215, and an editing unit 216.

The I/O controller 210 serves as an interface for the terminal 203. The drawing data mapping unit 211 maps the drawing data stored in the external storage unit 202. The display controller 212 displays the mapped drawing data on a display unit of the terminal 203.

The first setting unit 213 sets (selects) an objective dimension line according to data interactively entered through the terminal 203. According to the positional data of the objective dimension line, the first setting unit 213 may set drawing data to be edited for the objective dimension line.

The second setting unit 214 sets drawing data to be edited for the objective dimension line, according to data interactively entered through the terminal 203.

The decision unit 215 determines whether or not the drawing data to be edited involves a chamfer.

The editing unit 216 edits the drawing data set by the second setting unit 214 (or the first setting unit 213).

According to the third aspect of the present invention, the first setting unit 213 sets an objective dimension line included in a drawing displayed on the display unit, in response to an instruction interactively provided by a user through the terminal 203. At this time, if the user specifies, with the input unit 204, the right part of the objective dimension line, the first setting unit 213 may set (select) drawing data corresponding to the right endpoint of the dimension line as data to be edited. If the left part of the dimension line is specified, the unit 213 may set drawing data corresponding to the left endpoint of the dimension line as data to be edited. If the central part of the dimension line is specified, the unit 213 may set drawing data corresponding to both ends of the dimension line as data to be edited. In this way, the first setting unit 213 may automatically set drawing data to be edited according to positional data for a given dimension line.

When the first setting unit 213 does not carry out the objective drawing data setting process, the second setting unit 214 sets drawing data to be edited for the objective dimension line, according to an instruction interactively provided by the user through the terminal 203. If the user selects the right endpoint of the objective dimension line, the unit 214 selects drawing data corresponding to the right endpoint. If the left endpoint of the dimension line is selected, the unit 214 sets drawing data corresponding to the left endpoint. If both the endpoints are selected, the unit 214 sets drawing data corresponding to both endpoints.

Once the drawing data to be edited are set, the decision unit 215 tests cut lengths of two orthogonal straight lines (or cut lengths of corners) included in the drawing data and determines whether or not the drawing data involves a chamfer.

The user interactively sets a change quantity or a target length for the objective dimension line through the terminal 203. According to the entered data, the editing unit 216 edits the drawing data set by the second setting unit 214 (or by the first setting unit 213). If the decision unit 215 determines that the drawing data includes a chamfer, the editing unit 216 edits the drawing data without changing the chamfer.

The third aspect of the present invention enables a user to efficiently edit drawing data according to dimension lines without paying particular attention to chamfers. This aspect of the present invention never asks the user to specify the endpoints of dimension lines one by one.

Figure 25:
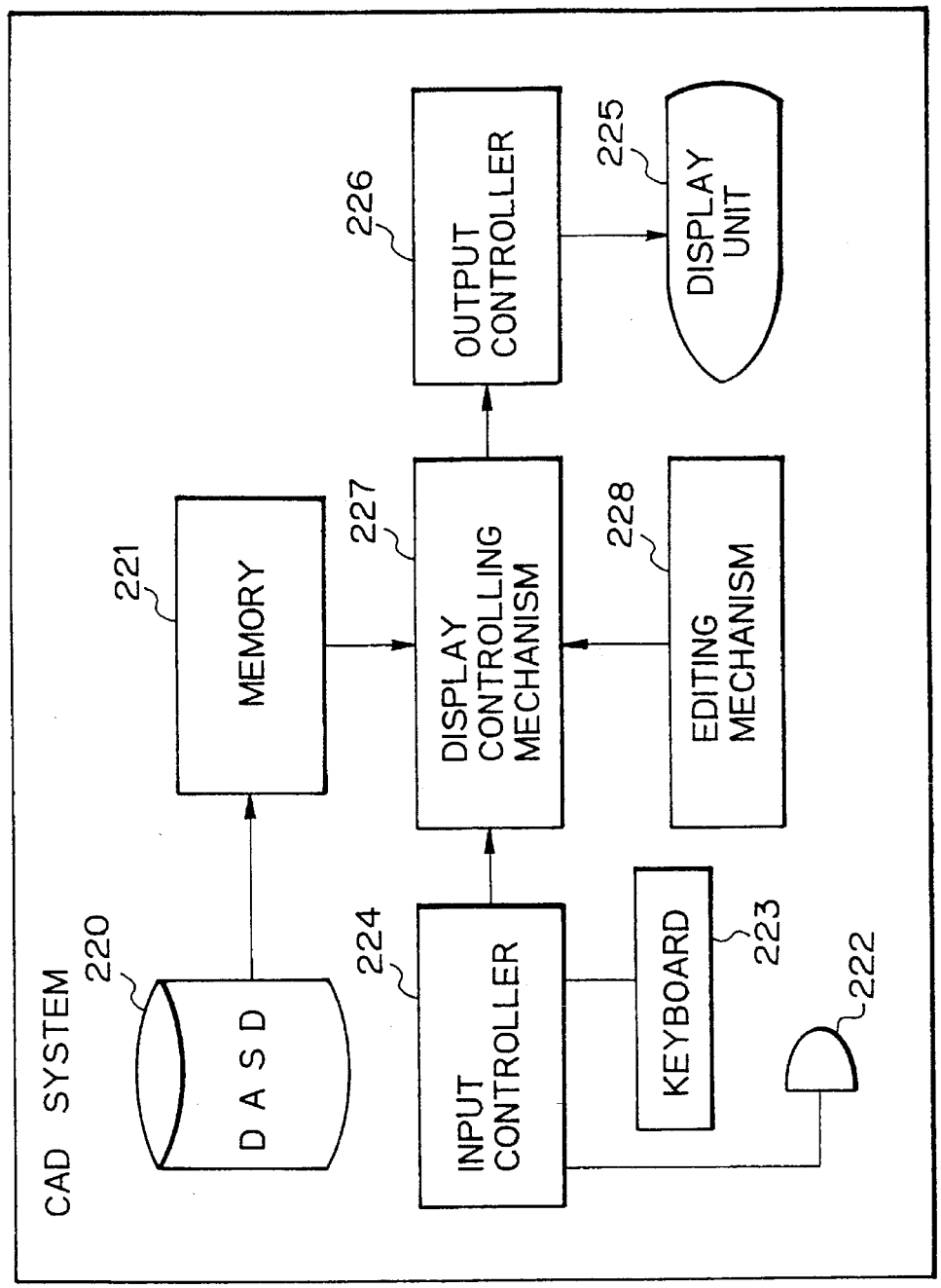
FIG. 25 shows a CAD system embodied on the third aspect of the present invention.

FIG. 25 is a block diagram showing a CAD system embodied on the third aspect of the present invention.

The CAD system has a DASD 220 for storing drawing data prepared by the CAD system, a memory 221 for mapping the drawing data stored in the DASD 220, a mouse 222 serving as an input unit, a keyboard 223 serving as an input unit, an input controller 224 for controlling the mouse 222 and keyboard 223, a display unit 225 for displaying drawing data, an output controller 226 for controlling the display unit 225, a display controlling mechanism 227 for controlling drawing data to be displayed, and an editing mechanism 228 for editing the drawing data.

Figure 26:
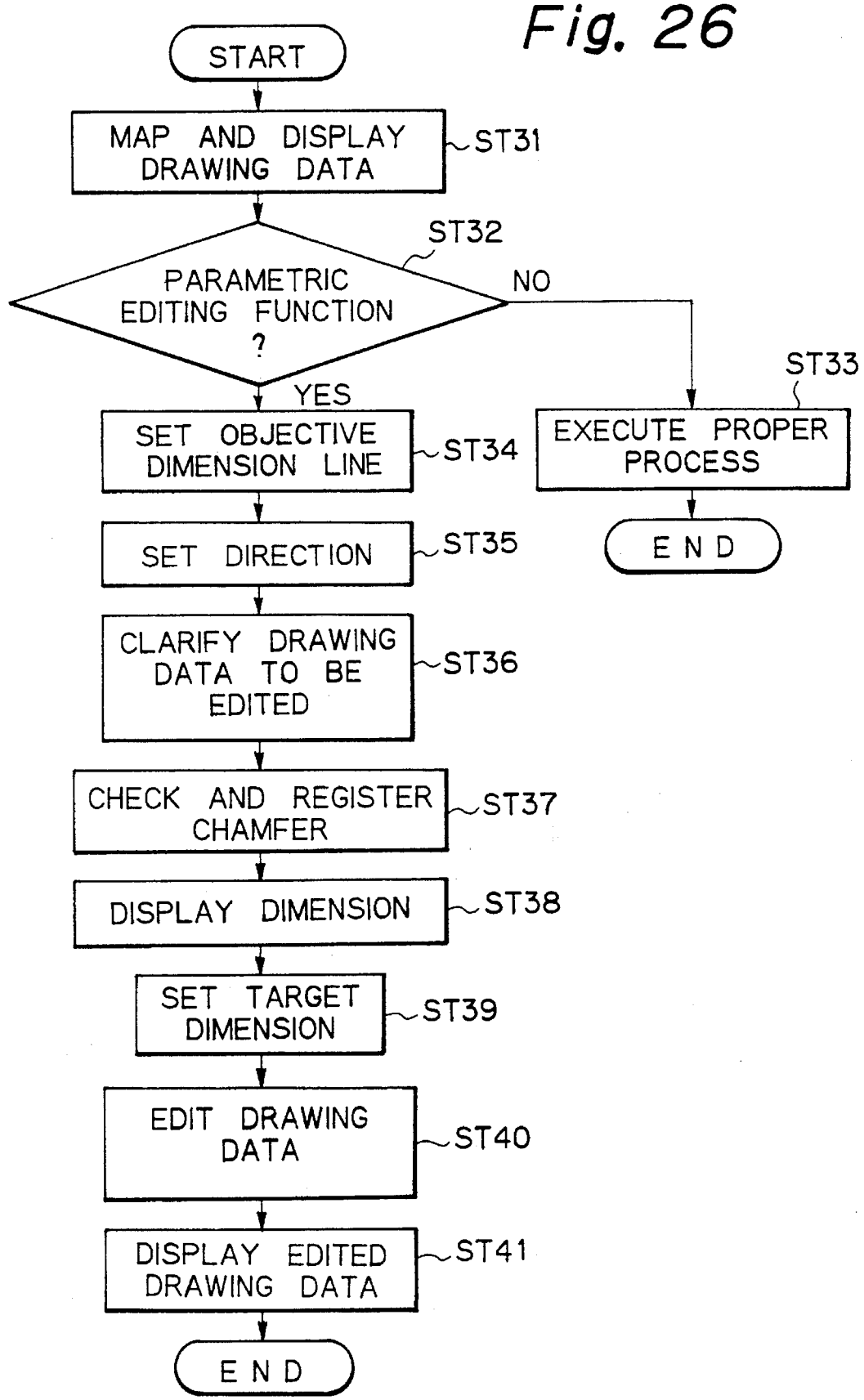
FIG. 26 shows a flow of processes carried out by the CAD system according to the third aspect of the present invention.

FIG. 26 shows the flow of the drawing data editing processes carried out by the editing mechanism 228 characteristic of the third aspect of the present invention.

The drawing data editing process according to the third aspect of the present invention will be explained in detail with reference to the flowchart of FIG. 26.

In step ST31, the editing mechanism 228 issues a display instruction to the display controlling mechanism 227, so that drawing data to be edited are mapped in the memory 221 and displayed on the display unit 225.

Step ST32 determines whether or not a parametric editing function for executing the editing process according to the third aspect of the present invention has been specified. If the parametric editing function has not been specified, step ST33 carries out a proper process to end the flow. The parametric editing process may be specified when a user selects with the mouse 222 a corresponding menu item displayed on the display unit 225.

Figure 27:
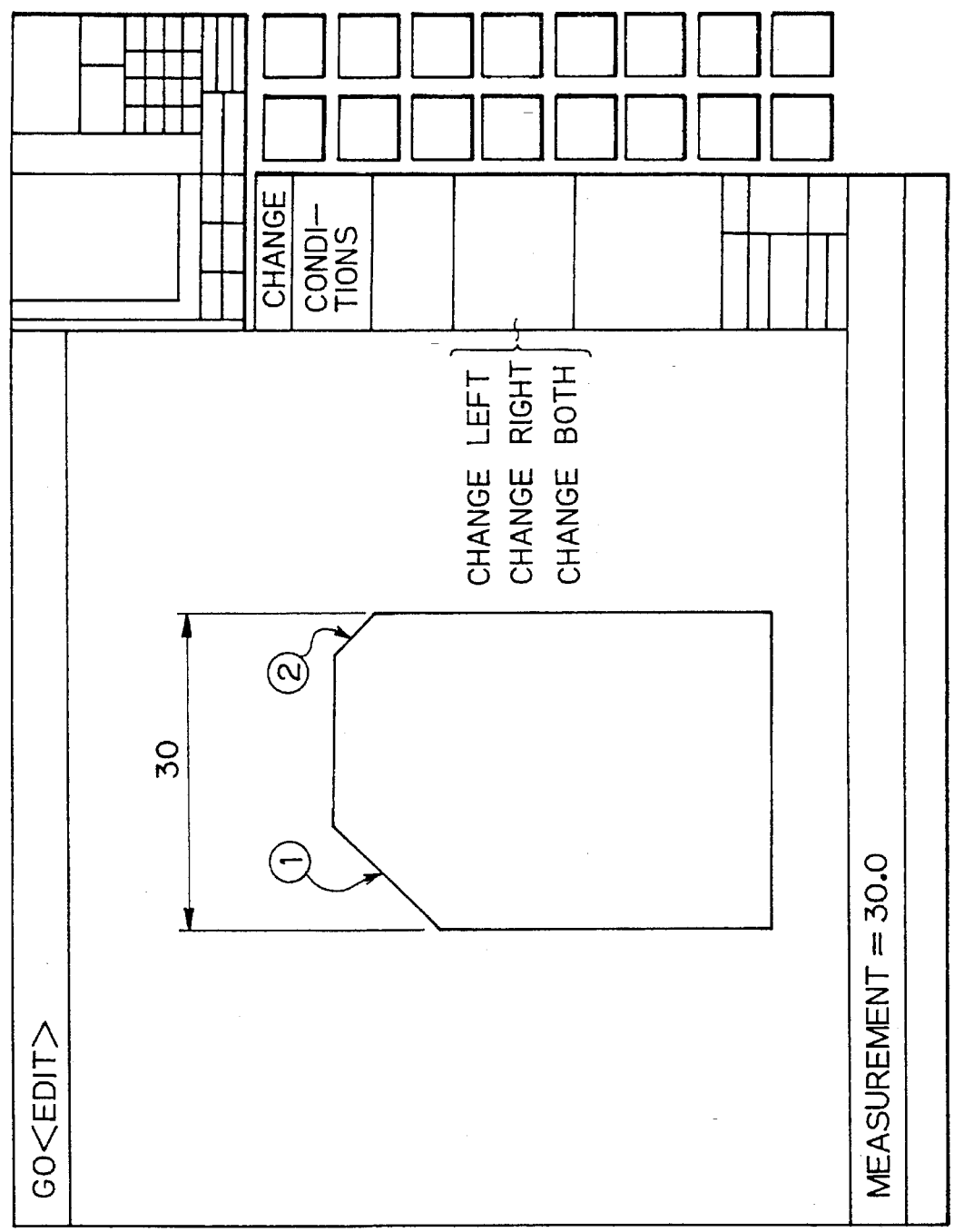
FIG. 27 shows a display screen for explaining a drawing data displaying process in the CAD system according to the third aspect of the present invention.
Figure 28:
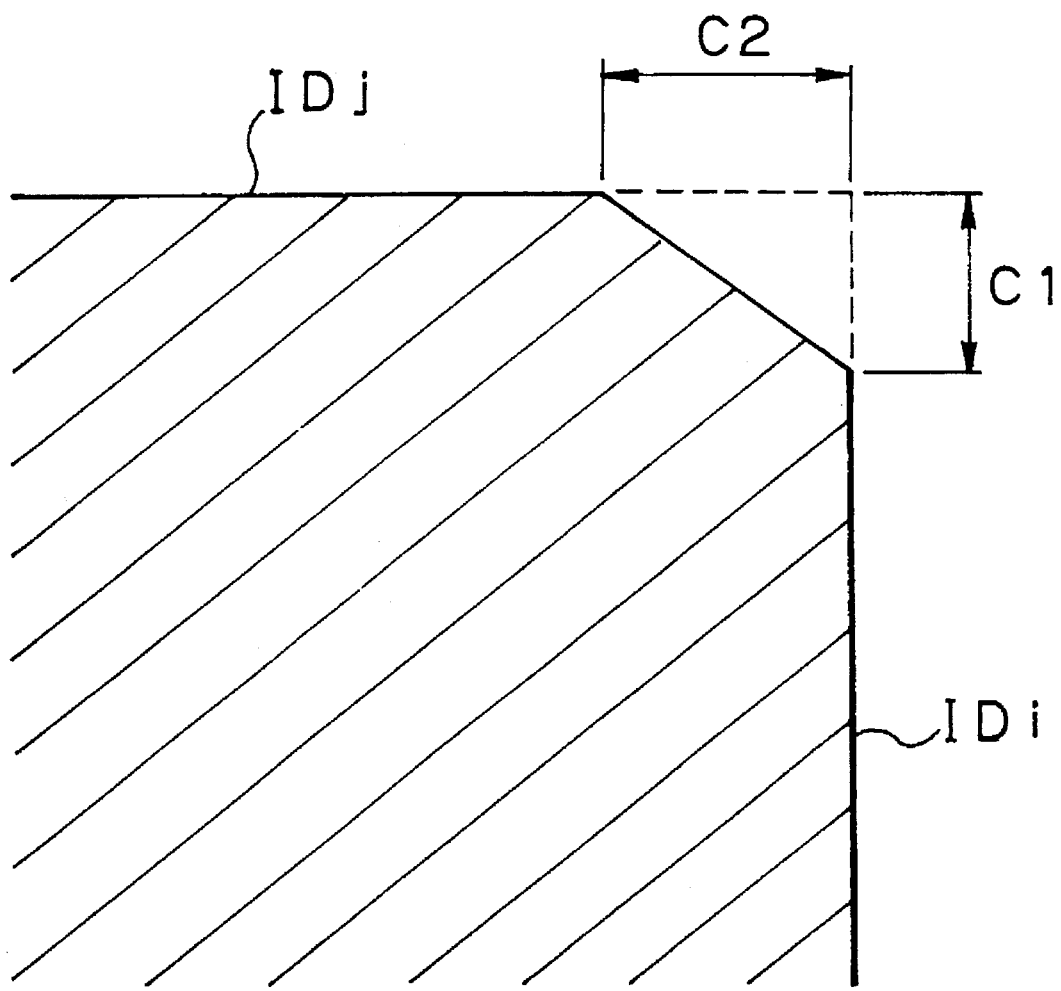
FIG. 28 explains a process of editing a dimension line involving a chamfer in the CAD system according to the third aspect of the present invention.
Figure 30:
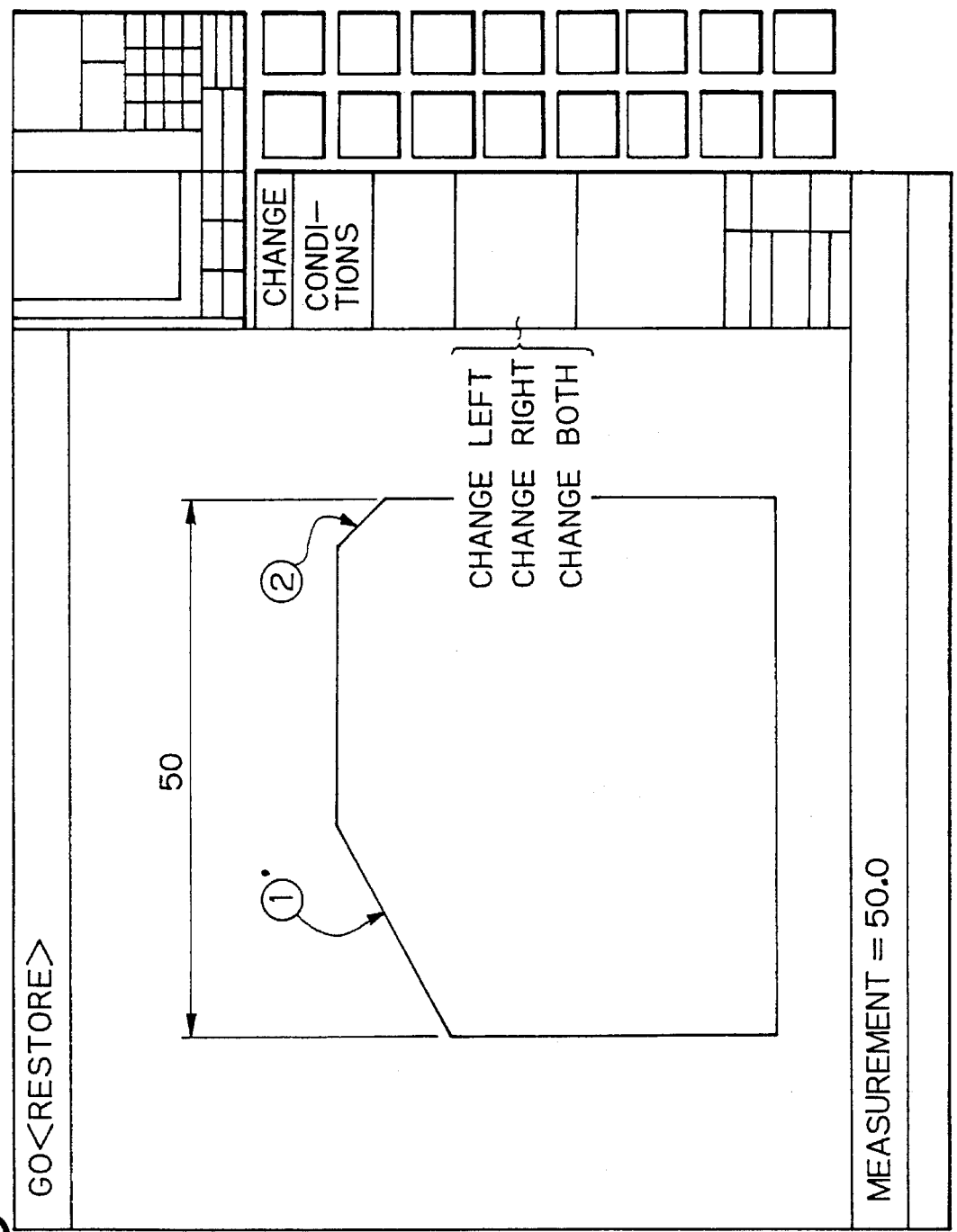
FIG. 30 shows a display screen for explaining an edited drawing displaying process in the CAD system according to the third aspect of the present invention.
Figure 31:
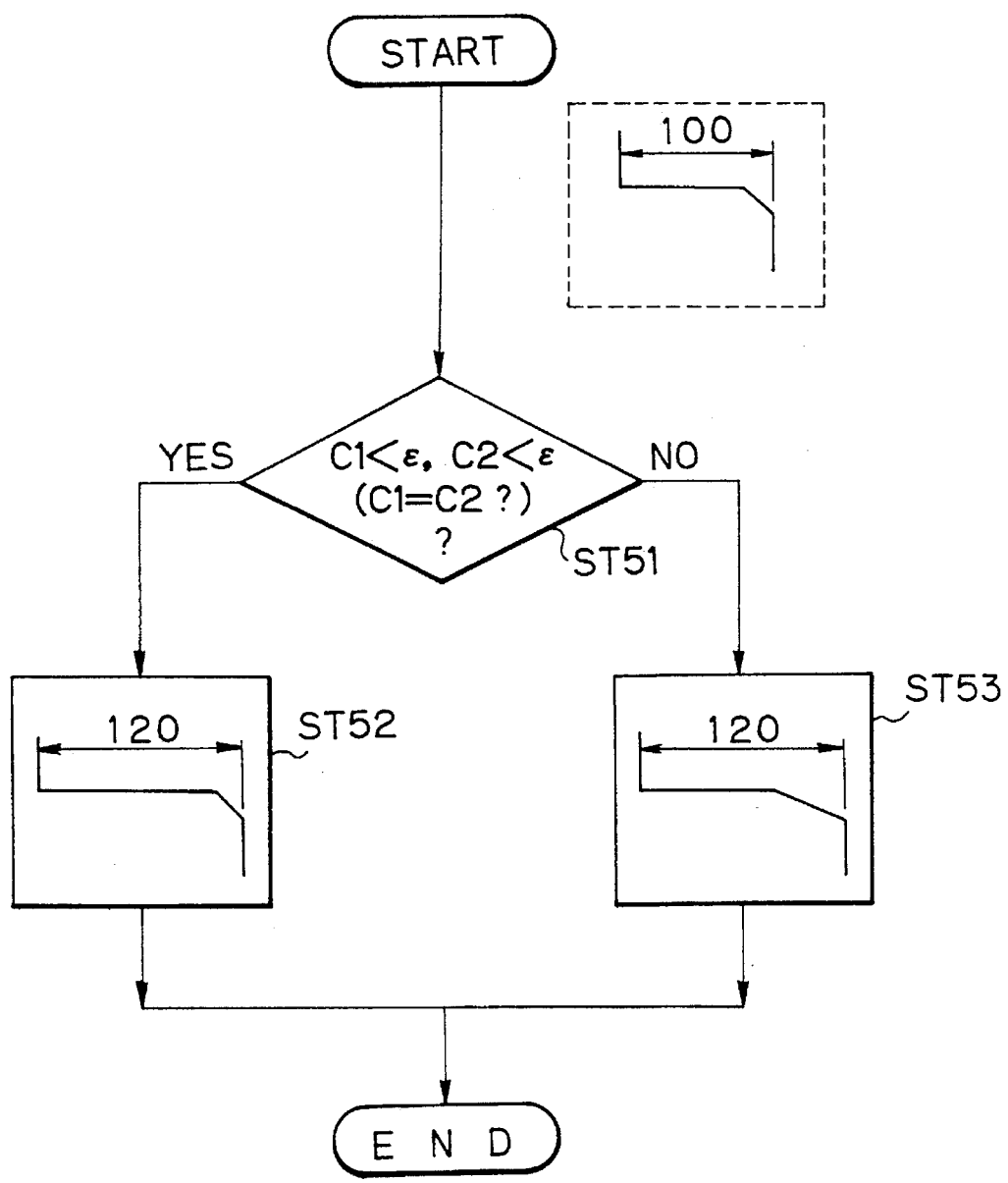
FIG. 31 shows a flow of processes carried out by the CAD system according to the third aspect of the present invention.

FIG. 27 shows a display screen for explaining a drawing data displaying process, FIG. 28 explains a process of handling a chamfer, FIGS. 29A and 29B show examples of drawing data, FIG. 30 shows a display screen for explaining an edited drawing data displaying process, and FIG. 31 is a flow chart showing a flow of dimension line editing processes. All of these processes are carried out by the CAD system according to the third aspect of the present invention.

If the step ST32 of FIG. 26 determines that the parametric editing function has been specified, step ST34 asks the user to interactively specify an objective dimension line in a drawing displayed on the display unit 225. The objective dimension line may be displayed in flashing red. In FIG. 27, the objective dimension line selected by the user with the mouse 222 is marked with an X and has a length of 30.

Step ST35 determines the lengthening (or shortening) direction of the objective dimension line. The display unit 225 may provide the menu items Change Left, Change Right, and Change Both to be selected by the user with the mouse 222.

As explained with reference to FIG. 9, when the user specifies, with the mouse 225, a left extension line or the left one-fifth part (I) of the objective dimension line, the right endpoint of the dimension line is fixed and the left endpoint of the dimension line is moved (lengthened or shortened). When a right extension line or the right one-fifth part (III) of the objective dimension line is specified, the left endpoint is fixed, and the right endpoint is moved. When the central three-fifths part (II) of the objective dimension line, or a numeric part indicating the length of the dimension line is specified, both the endpoints of the dimension line are uniformly moved.

In this way, as an objective dimension line is changed, the lengthening (or shortening) direction of the dimension line is automatically set.

When the numeric part of a dimension line is specified, the lengthening (or shortening) direction is determined according to the starting position of the numeric part, e.g., the position of the leftmost numeral in the numeric part. If the starting position is in the left one-fifth part (I) of FIG. 9, the right endpoint of the dimension line is fixed, and the left endpoint of the dimension line is lengthened or shortened. The same rules are applicable for vertical dimension lines.

Step ST36 displays drawing data corresponding to the lengthening (or shortening) direction of the objective dimension line in red (red color). At this time, drawing data corresponding to the objective dimension line is displayed in red. If the lengthening (or shortening) direction (or moving side) of the objective dimension line is left, drawing data corresponding to a left endpoint of the dimension line is displayed in red, and if the direction (moving side) is right, drawing data corresponding to a right endpoint of the dimension line is displayed in red. If the objective dimension line is changed in both directions, the drawing data corresponding to both endpoints are displayed in red.

Step ST37 determines whether or not the drawing data to be edited involves a chamfer and records the result of the determination.

As shown in FIG. 28, the step ST37 tests whether or not the cut lengths (chamfered portions) C1 and C2 of two orthogonal straight lines IDi and IDj included in the drawing data to be edited are each smaller than a reference value. If each of them is smaller than the reference value, it is determined that the drawing data involve a chamfer, and if not, it is determined that the objective drawing data do not involve a chamfer.

FIG. 29A shows drawing data mapped in the memory 221. The drawing data include straight element data each having an ID number. FIG. 29B shows the ID numbers and cut lengths of first and third segments that are orthogonal to each other. According to the data of FIGS. 29A and 29B, it is determined whether or not given drawing data involve a chamfer.

Step ST38 displays the present length of the objective dimension line at a lower left part of the display, as shown in FIG. 27. A cursor is positioned on the displayed length.

In step ST39, a user interactively enters a target length for the objective dimension line. If the user wants to change the length of the dimension line from 30 to 50, for example, the user enters the length 50 through the keyboard 223.

Step ST40 edits the objective drawing elements determined in the step ST35 in the lengthening (or shortening) direction determined in the step ST35, so that the objective dimension line set in the step ST34 gets the target length set in the step ST39.

More precisely, when the length of the objective dimension line is changed from 30 to 50 in the left moving, drawing data corresponding to the left endpoint of the objective dimension line is moved only to the left direction by a change length of 20. When the lengthening (or shortening) direction (or moving side) is right, drawing data for a right endpoint of the dimension line is moved only to the right direction by the change length of 20. When the objective dimension line is changed in both directions, the drawing data corresponding to both endpoints of the dimension line are moved by a change length of 10.

If the step ST37 has registered a chamfer, the drawing data are edited with the chamfer kept intact. Namely, the objective drawing data are collectively moved without changing the cut lengths of the chamfer (chamfered portions).

Step ST41 displays the edited drawing data as shown in FIG. 30. Namely, original drawing data of FIG. 27 are edited into those shown in FIG. 30. In FIG. 27, a part (1) is not a chamfer, and a part (2) is a chamfer. The dimension line having a length of 30 is equally lengthened to 50 from both endpoints thereof. Since the part (1) in FIG. 27 is not a chamfer, this part is changed into a shape (1)' in FIG. 30. Since the part (2) of FIG. 27 is a chamfer, it is unchanged as indicated with (2) in FIG. 30. Namely, the chamfer is preserved as it is.

In FIG. 30, a menu item Change may be selected to start the parametric editing function, Change Left may be selected to move left endpoint of a given dimension line, Change Right may be selected to move right endpoint of a given dimension line, and Change Both to lengthen (or shorten) both ends of a given dimension line.

In this way, the third aspect of the present invention edits drawing data while automatically preserving a chamfer, as shown in FIG. 31.

In FIG. 31, step ST51 tests whether or not cut lengths C1 and C2 of two orthogonal straight lines included in drawing data to be edited are each smaller than a reference value $\epsilon$. If the step ST51 determines that $C1<\epsilon$ and $C2<\epsilon$, it is determined that the drawing data includes a chamfer. Then, step ST52 processes the drawing data without deforming the chamfer.

If the step ST51 determines that $C1<\epsilon$ and $C2<\epsilon$ are not true, it is determined that the drawing data do not include a chamfer. Accordingly, step ST53 processes the drawing data without regard to chamfers. In addition to determining whether or not the cut lengths C1 and C2 of the two orthogonal straight lines are each smaller than the reference value $\epsilon$ in the step ST51, determining whether or not the lengths C1 and C2 are equal to each other may be carried out to find a chamfer having an angle of 45 degrees.

As explained above, the CAD system according to the third aspect of the present invention enables a user to efficiently edit drawing data without paying particular attention to chamfers. Namely, the CAD system automatically preserves the chamfers. In addition, the CAD system never asks the user to specify endpoints of dimension lines one by one.

Many different embodiments of the present invention may be constructed without departing from the spirit and scope of the present invention, and it should be understood that the present invention is not limited to the specific embodiments described in this specification, except as defined in the appended claims.

We claim:

1. A Computer Aided Design (CAD) system for managing a drawing involving object dimension lines, displaying said drawing on a display means connected to a terminal, and editing said drawing according to a specified one of said dimension lines designated as an objective dimension line, wherein said CAD system comprises:

setting means for interactively designating the objective dimension line through said terminal;

retrieving means for automatically retrieving, in said drawing, dimension lines that are in parallel with said objective dimension line; and editing means for automatically editing drawing data corresponding to said objective and parallel dimension lines according to a change quantity entered for said objective dimension line.

2. A CAD system as claimed in claim 1, wherein said editing means determines drawing data to be edited according to positional data for said objective dimension line, said positional data being set by said setting means.

3. A CAD system as claimed in claim 1, wherein said CAD system further comprises an area setting means for interactively designating a retrieval area in which said retrieving means retrieves said parallel dimension lines.

4. A CAD system as claimed in claim 1, wherein said objective dimension line designated by said setting means is a shortest of said dimension lines that are parallel to one another.

5. A Computer Aided Design (CAD) system for managing a drawing involving object dimension lines, displaying said drawing on a display means connected to a terminal, and editing said drawing according to a specified one of said dimension lines designated as an objective dimension line, wherein said CAD system comprises:

setting means for interactively designating the objective dimension line through said terminal and selecting one or both of endpoints of said objective dimension line according to positional data of said objective dimension line specified during said setting process;

retrieving means for automatically retrieving, in said drawing, dimension lines that are in parallel with said objective dimension line;

editing means for automatically editing drawing data corresponding to said objective and parallel dimension lines according to a change quantity entered for said objective dimension line; and decision means for determining a changing direction of said objective dimension line designated by said setting means according to a dimension change quantity specified for said objective dimension line.

6. A CAD system as claimed in claim 5, wherein said CAD system further comprises mark display controlling means for displaying a direction mark on said display means, said direction mark indicating said changing direction determined by said decision means and being displayed in a vicinity of the endpoint set by said setting means.

7. A CAD system as claimed in claim 6, wherein said mark display controlling means employs an arrow mark as said direction mark.

8. A Computer Aided Design (CAD) system for managing a drawing involving object dimension lines, displaying said drawing on a display means connected to a terminal, and editing said drawing according to a specified one of said dimension lines designated as an objective dimension line, wherein said CAD system comprises:

first setting means for interactively designating the objective dimension line through said terminal;

second setting means for interactively selecting one or both of endpoints of said objective dimension line through said terminal;

retrieving means for automatically retrieving, in said drawing, dimension lines that are in parallel with said objective dimension line;

editing means for automatically editing drawing data corresponding to said objective and parallel dimension lines according to a change quantity entered for said objective dimension line; and decision means for determining a changing direction of said objective dimension line designated by said first setting means according to a dimension change quantity specified for said objective dimension line.

9. A CAD system as claimed in claim 8, wherein said CAD system further comprises mark display controlling means for displaying a direction mark on said display means, said direction mark indicating the changing direction determined by the decision means and being positioned in a vicinity of the endpoint set by said second setting means.

10. A CAD system as claimed in claim 9, wherein said mark display controlling means employs an arrow mark as the direction mark.

11. A Computer Aided Design (CAD) system for managing a drawing involving dimension lines, displaying said drawing on a display means connected to a terminal, and editing said drawing according to a specified one of said dimension lines designated as an objective dimension line, wherein said CAD system comprises:

setting means for interactively designating the objective dimension line through said terminal and selecting drawing data to be edited among drawing data corresponding to said objective dimension line according to positional data of said objective dimension line specified during the setting process;

decision means for determining whether or not the drawing data to be edited includes a chamfer;

retrieving means for automatically retrieving, in said drawing, dimension lines that are in parallel with said objective dimension line; and editing means for automatically editing the drawing data corresponding to said objective and parallel dimension lines to be edited according to a change quantity given to said objective dimension line without deforming the chamfer found by said decision means.

12. A Computer Aided Design (CAD) system for managing a drawing involving dimension lines, displaying said drawing on a display means connected to a terminal, and editing said drawing according to a specified one of said dimension lines designated as an objective dimension line, wherein said CAD system comprises:

first setting means for interactively designating the objective dimension line through said terminal;

second setting means for interactively designating, through said terminal, drawing data to be edited among drawing data corresponding to said objective dimension line;

decision means for determining whether or not the drawing data to be edited includes a chamfer;

retrieving means for automatically retrieving, in said drawing, dimension lines that are in parallel with said objective dimension line; and editing means for automatically editing the drawing data corresponding to said objective and parallel dimension lines to be edited according to a change quantity given to said objective dimension line without deforming the chamfer found by said decision means.

13. A computer aided design (CAD) process for managing a drawing involving dimension lines, displaying said drawing on a display means connected to a terminal, and editing said drawing according to a specified one of said dimension lines designated as an objective dimension line, wherein said process comprises:

- interactively designating the objective dimension line through said terminal;
- automatically retrieving, in said drawing, dimension lines that are in parallel with said objective dimension line; and
- automatically editing drawing data corresponding to said objective and parallel dimension lines according to a change quantity entered for said objective dimension line.

14. A computer aided design (CAD) process for managing a drawing involving dimension lines, displaying said drawing on a display means connected to a terminal, and editing said drawing according to a specified one of said dimension lines designated as an objective dimension line, wherein said process comprises:

- interactively designating the objective dimension line through said terminal without a user entering any relational constraints;
- retrieving, in said drawing, dimension lines that are in parallel with said objective dimension line; and
- editing drawing data corresponding to said objective and parallel dimension lines according to a change quantity entered for said objective dimension line.

15. A computer aided design (CAD) process for managing a drawing involving dimension lines, displaying said drawing on a display means connected to a terminal, and editing said drawing according to a specified one of said dimension lines designated as an objective dimension line, wherein said process comprises:

- interactively designating the objective dimension line through said terminal;
- retrieving, in said drawing, dimension lines that are in parallel with said objective dimension line; and
- editing drawing data corresponding to said objective and parallel dimension lines based on only a change quantity entered for said objective dimension line and the designating.

* * * * *

UNITED STATES PATENT AND TRADEMARK OFFICE
CERTIFICATE OF CORRECTION

PATENT NO.   : 5,548,706
DATED        : August 20, 1996
INVENTOR(S)  : Koizumi et al.

It is certified that error appears in the above-indentified patent and that said Letters Patent is hereby corrected as shown below:

Column 3, line 18, "FIG." should be --FIGS.-- and after "function" delete ",".

Signed and Sealed this

Eleventh Day of March, 1997

Attest:

BRUCE LEHMAN

*Attesting Officer*   *Commissioner of Patents and Trademarks*